US007844033B2

(12) United States Patent
Drum et al.

(10) Patent No.: US 7,844,033 B2
(45) Date of Patent: Nov. 30, 2010

(54) METHODS, SYSTEMS, AND COMPUTER PROGRAM PRODUCTS FOR GENERIC CALL TRACING

(75) Inventors: Michael J. Drum, Cary, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 1024 days.

(21) Appl. No.: 11/446,833

(22) Filed: Jun. 5, 2006

(65) Prior Publication Data

US 2006/0274661 A1 Dec. 7, 2006

Related U.S. Application Data

(60) Provisional application No. 60/687,090, filed on Jun. 3, 2005.

(51) Int. Cl.
*H04M 1/24* (2006.01)
*H04M 3/08* (2006.01)
*H04M 3/22* (2006.01)

(52) U.S. Cl. .................. 379/32.05; 379/23; 379/32.03; 379/32.04

(58) Field of Classification Search .............. 379/1.01, 379/9, 10.01, 15.01, 22, 29.01, 32.01, 32.02, 379/32.03, 32.05, 16, 23; 370/231, 236, 370/248, 251, 352–360
See application file for complete search history.

(56) References Cited

U.S. PATENT DOCUMENTS 5,809,121 A * 9/1998 Elliott et al. ............ 379/127.01
5,867,558 A * 2/1999 Swanson ................... 379/9.03

(Continued)

FOREIGN PATENT DOCUMENTS

EP 0805609 11/1997

(Continued)

OTHER PUBLICATIONS

Commonly-assigned, co-pending U.S. Appl. No. 11/491,473 for "Methods, Systems, and Computer Program Products for Associating Communications Detail Records with a Mobile Reference and Using the Mobile Reference to Retrieve the Communications Detail Records," (Unpublished, filed Jul. 21, 2006).

(Continued)

*Primary Examiner*—Binh K Tieu
(74) *Attorney, Agent, or Firm*—Jenkins, Wilson, Taylor & Hunt, P.A.

(57) ABSTRACT

Methods, systems, and computer program products for performing a trace of a communications transaction using a dynamically generated endpoint identifier list are disclosed. According to one method, a first endpoint identifier for identifying a communications endpoint is received. A list including the first endpoint identifier is created. A signaling message including the first endpoint identifier may be searched for in the list. A parameter from the signaling message having the first endpoint identifier may be extracted that is distinct from the endpoint identifier. Further, the method may include searching for signaling messages having the extracted parameter. The method may include adding to the list any endpoint identifiers found in the search for signaling messages having the extracted parameter. The method may include searching for signaling messages having any of the endpoint identifiers in the list and thereby tracing a communications transaction involving endpoints in the endpoint identifier list.

27 Claims, 20 Drawing Sheets

U.S. PATENT DOCUMENTS

| | | | |
|---|---|---|---|
| 5,881,132 A | | 3/1999 | O'Brien et al. |
| 6,009,321 A | | 12/1999 | Wang et al. |
| 6,028,914 A | * | 2/2000 | Lin et al. ................. 379/14 |
| 6,088,587 A | | 7/2000 | Abbadessa |
| 6,091,950 A | | 7/2000 | Remy |
| 6,105,065 A | | 8/2000 | Rao et al. |
| 6,108,782 A | | 8/2000 | Fletcher et al. |
| 6,137,876 A | | 10/2000 | Wong et al. |
| 6,195,416 B1 | * | 2/2001 | DeCaluwe et al. ....... 379/32.05 |
| 6,456,845 B1 | | 9/2002 | Drum et al. |
| 6,700,963 B1 | | 3/2004 | Jordan |
| 6,721,405 B1 | * | 4/2004 | Nolting et al. ............. 379/133 |
| 6,744,866 B1 | * | 6/2004 | Nolting et al. ............. 379/133 |
| 6,765,990 B2 | * | 7/2004 | Freedman et al. ........ 379/32.05 |
| 6,771,635 B1 | | 8/2004 | Vilander et al. |
| 6,842,620 B2 | | 1/2005 | Smith et al. |
| 6,882,727 B1 | | 4/2005 | Vialen et al. |
| 7,050,549 B2 | * | 5/2006 | Hannigan ................ 379/32.02 |
| 2003/0009557 A1 | | 1/2003 | Carson et al. |
| 2004/0203650 A1 | | 10/2004 | Halpern |
| 2006/0274661 A1 | * | 12/2006 | Drum et al. ................. 370/241 |
| 2007/0010239 A1 | | 1/2007 | Connelly |
| 2007/0021096 A1 | | 1/2007 | Arslan |

FOREIGN PATENT DOCUMENTS

| | | |
|---|---|---|
| EP | 1 041 830 A1 | 10/2000 |
| WO | WO 2007/014157 A2 | 1/2007 |

OTHER PUBLICATIONS

Notification of Transmittal of the International Search Report and the Written Opinion of the International Searching Authority, or the Declaration for International Application No. PCT/US06/21746 (Aug. 17, 2007).

Final Office Action for U.S. Appl. No. 11/491,473 (Feb. 1, 2010).

Official Action for U.S. Appl. No. 11/491,473 (Apr. 29, 2009).

Notification of Transmittal of the International Search Report and the Written Opinion of the International Searching Authority, or the Declaration for International Application No. PCT/US06/28681 (Apr. 2, 2007).

* cited by examiner

FIG. 20

METHODS, SYSTEMS, AND COMPUTER PROGRAM PRODUCTS FOR GENERIC CALL TRACING

RELATED APPLICATIONS

This application claims the benefit of U.S. Provisional Patent Application Ser. No. 60/687,090, filed Jun. 3, 2005, the disclosure of which is hereby incorporated herein by reference in its entirety.

TECHNICAL FIELD

The subject matter described herein relates to methods, systems, and computer program products for tracing calls communicated in a network environment. More particularly, the subject matter described herein relates to methods, systems, and computer program products for generic call tracing.

BACKGROUND

In certain instances, a network operator may desire to implement call tracing for finding signaling messages of a call sequence associated with a particular endpoint identifier, such as a telephone number. The operator may initiate call tracing by entering the telephone number into a workstation in communication with a network monitoring device. The network monitoring device is operable to copy and store signaling messages communicated between network elements in the network environment. The entered telephone number is then utilized to search the signaling messages stored in the network monitoring device for finding the signaling messages of a call sequence associated with the entered telephone number.

Typically, a call trace begins when an operator enters a telephone number. Next, a call trace application may search the stored signaling messages for a signaling message with a telephone number field including the entered telephone number. The located signaling message is a message in a call sequence associated with the entered telephone number and includes information for finding another signaling message in the call sequence. For example, in a provide roaming number transaction, the located message may be a GSM mobile application part (MAP) message transmitted from a mobile switching center (MSC) to a home location register (HLR) for requesting that the HLR send routing information for a mobile subscriber. Information, such as TCAP transaction ID, may be extracted from the located message for finding another specific type of signaling message in the call sequence associated with the entered telephone number. The call trace application identifies the end of a call sequence based on the specific message type. For example, an ISDN user part (ISUP) IAM message may indicate the end of a call trace sequence for a provide roaming number transaction.

Currently, call tracing is implemented by searching for specific types of messages in a specific order. For example, there are many different scenarios that are possible for tracing a call and each scenario must be programmed in a call trace application to enable the application to implement call tracing for each of the possible scenarios. Implementing such a call tracing technique results in increased programming complexity and reduced processing efficiency.

Therefore, it is desirable to provide generic call tracing methods and systems for reducing programming complexity and increasing processing efficiency.

SUMMARY

According to one aspect, the subject matter described herein comprises methods, systems, and computer program products for performing a trace of a communications transaction using a dynamically generated endpoint identifier list. One method includes receiving a first endpoint identifier for identifying a communications endpoint. Next, an endpoint identifier list including the first endpoint identifier may be created. The method may include searching for and locating a signaling message including the first endpoint identifier in the endpoint identifier list. At least one parameter from the signaling message having the first endpoint identifier may be extracted. The extracted parameter may be distinct from the endpoint identifier. Further, the method may include searching for signaling messages having the extracted parameter. The method may include adding to the endpoint identifier list any endpoint identifiers found in the search for signaling messages having the extracted parameter. Next, the method may include searching for signaling messages having any of the endpoint identifiers in the endpoint identifier list, thereby tracing a communications transaction involving endpoints identified in the endpoint identifier list.

The subject matter described herein may be implemented as a computer program product comprising computer executable instructions embodied in a computer readable medium. Exemplary computer readable media suitable for implementing the subject matter described herein include disk memory devices, chip memory devices, application specific integrated circuits, programmable logic devices, and downloadable electrical signals. In addition, a computer program product that implements the subject matter described herein may be located on a single device or computing platform. Alternatively, the subject matter described herein may be implemented on a computer program product that is distributed across multiple devices or computing platforms.

BRIEF DESCRIPTION OF THE DRAWINGS

Exemplary embodiments of the subject matter will now be explained with reference to the accompanying drawings, of which:

FIG. 20 is a screen display of data associated with a plurality of signaling messages in a database.

DETAILED DESCRIPTION

Figure 1:
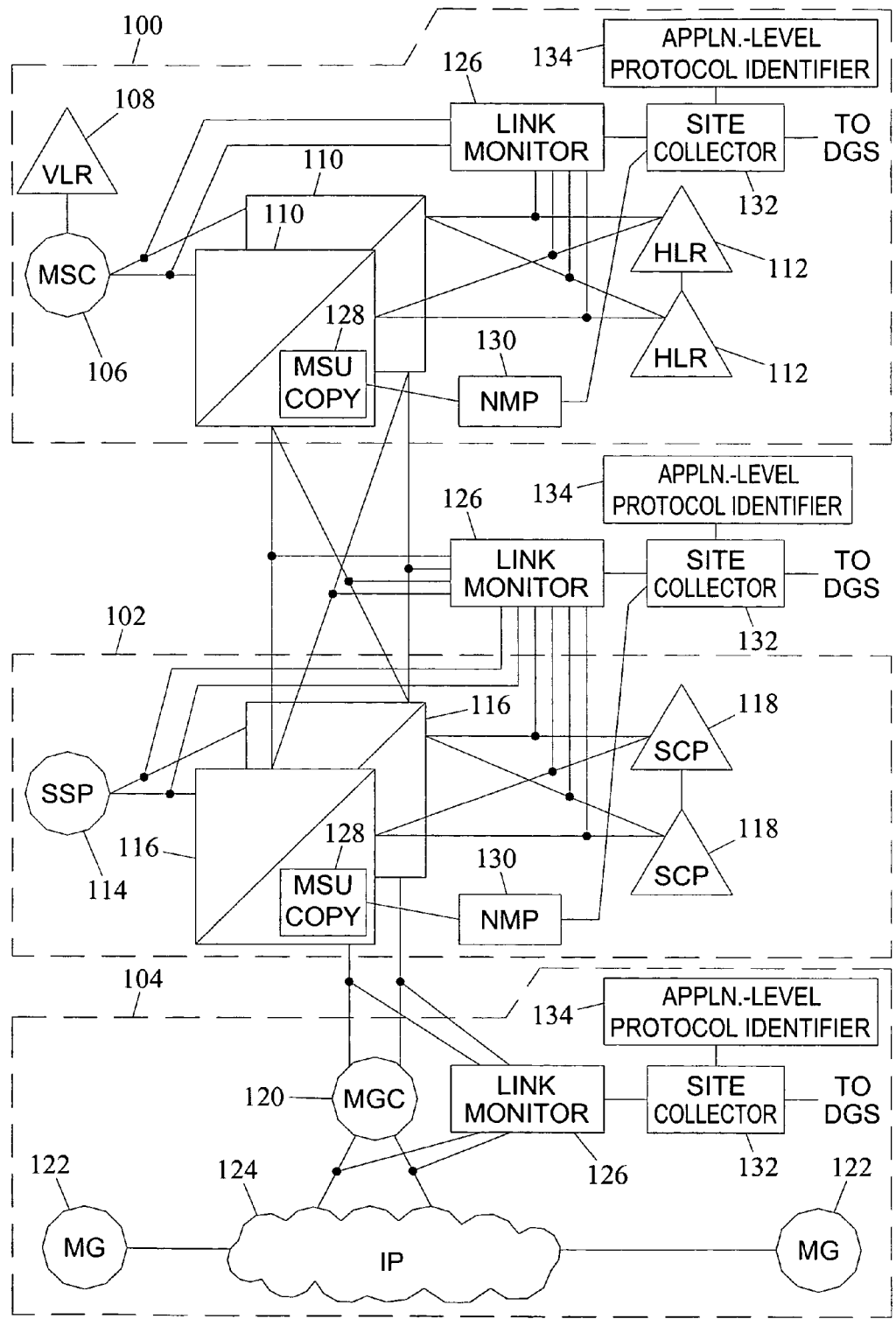
FIG. 1 is a block diagram of an exemplary telecommunications signaling network and the associated network monitoring platforms for collecting signaling messages that may be utilized for tracing a call according to the subject matter described herein.

The subject matter described herein includes methods, systems, and computer program products for generic call tracing. FIG. 1 illustrates an exemplary telecommunications signaling network and the associated network monitoring platforms for collecting signaling messages that may be utilized for tracing a call according to the subject matter described herein. Referring to FIG. 1, the network includes a wireless component 100 for generating and routing signaling messages associated with wireless telecommunications, a wireline component 102 for generating and routing signaling messages associated with wireline communications, and an IP telephony component 104 for generating and routing signaling messages associated with IP telephony communications. Wireless component 100 includes a mobile switching center (MSC) 106, a visitor location register (VLR) 108, a signal transfer point (STP) pair 110, and a home location register (HLR) pair 112. MSC 106 originates and terminates calls to and from mobile subscribers. VLR 108 is a database that stores information regarding subscribers roaming in a particular network. STPs 110 route signaling messages between other network entities. HLRs 112 store subscriber records and subscriber location information.

Wireline component 102 includes a service switching point (SSP) 114, an STP pair 116, and a service control point (SCP) pair 118. SSP 114 originates and terminates calls to and from wireline subscribers. STP pair 116 routes signaling messages between other network entities. SCP pair 118 provides application-level database services, such as LIDB, CNAM, and N00 service. Since these protocols may be of interest for network monitoring, usage measurements, and billing purpose, the methods and systems of the present subject matter are preferably capable of identifying these and other application-level protocols.

IP telephony component 104 includes a media gateway controller 120 and media gateways 122. Media gateway controller 120 controls media gateways 122 to set up calls between end users via IP network 124. Media gateways 122 handle media stream communications between end users.

The network illustrated in FIG. 1 also includes a plurality of link monitors 126 for copying SS7 signaling messages. Link monitors 126 may include link probes that connect to external signaling links that interconnect network elements. For example, if a link monitor 126 is co-located with a STP pair, link monitor 126 may be connected to signaling links terminated by the STP pair. Exemplary commercially available link monitors suitable for use with embodiments of the present subject matter are the i2000 and i3000 shelves available from Tekelec of Morrisville, N.C. Briefly, these link monitors include external link probes that non-intrusively copy signaling messages from signaling links. The link monitors connect to a shelf. The shelf is a computing platform that includes a plurality of link interface controllers that interface directly with the link probes. The shelf also includes link interface modules that run various link monitoring and traffic simulation applications.

In addition to external link monitors 126, internal link monitors 128 and associated network monitoring processors 130 may be used to copy signaling messages from within network nodes, such as STPs. Briefly, this network monitoring system includes message copy functions located on link interface cards within a signal transfer point. The signal transfer point also includes a network monitoring transport card that transports messages copied from signaling links to network monitoring processors 130 located external to the signal transfer point. Network monitoring processors 130 store copied signaling messages and forward the signaling messages to downstream network monitoring applications.

A plurality of site collectors 132 collects signaling messages copied by both internal and external link monitors. In the illustrated example, each site collector 132 includes an application-level protocol identifier 134. Each application-level protocol identifier 134 examines non-application-level parameters, national variant, and application-level parameters to determine the application protocol of received signaling messages.

Figure 2:
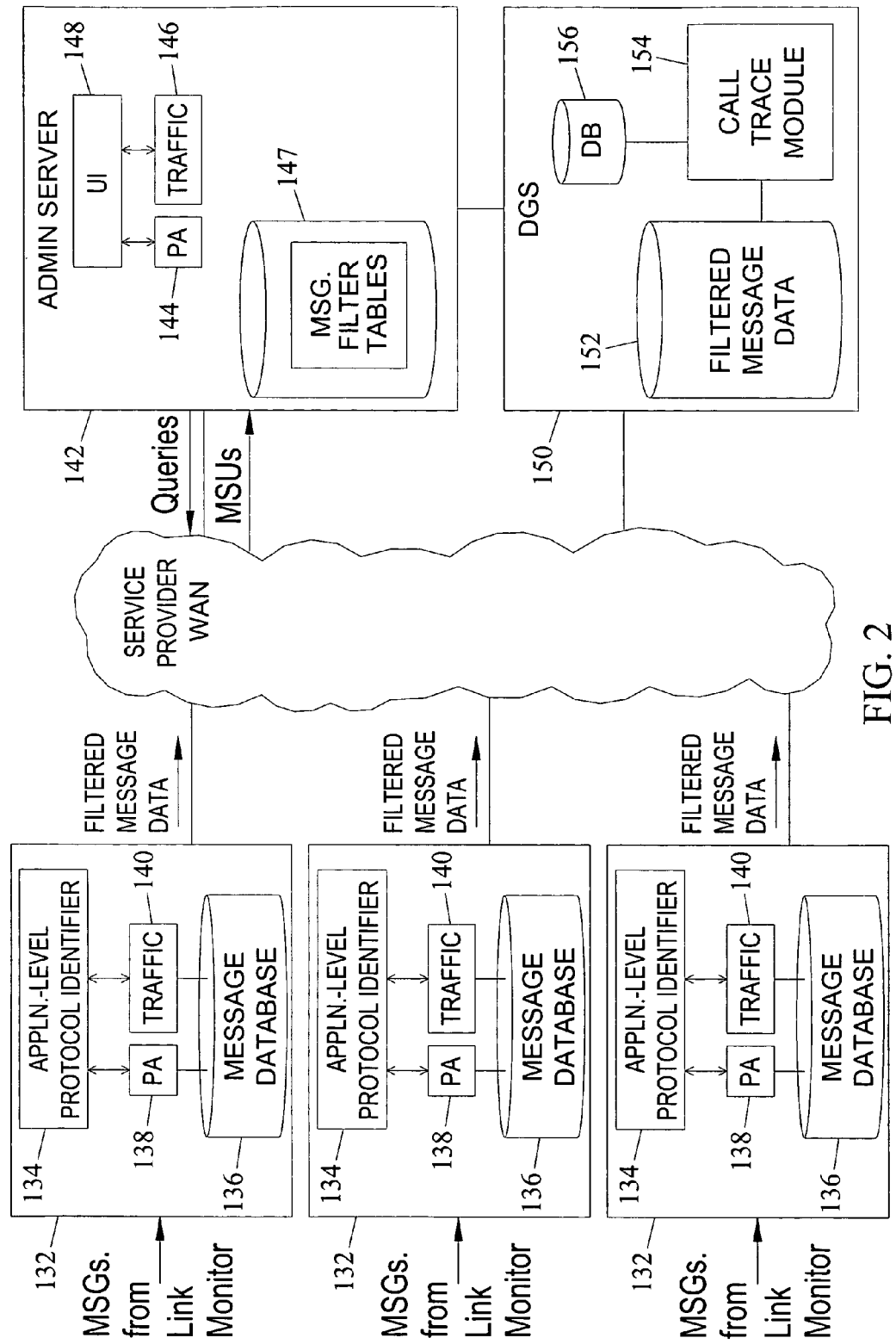
FIG. 2 is a block diagram of more details of site collectors and application-level protocol identifiers shown in FIG. 1.

FIG. 2 is a block diagram illustrating site collectors 132 and application-level protocol identifiers 134 in more detail. Referring to FIG. 2, each site collector 132 receives signaling messages copied from its associated link monitor or link monitors. Each site collector 132 stores the signaling messages in a message database 136. Network monitoring applications, such as protocol analysis application 138 and traffic application 140, perform various network monitoring functions based on the signaling messages stored in the database. For example, protocol analysis application 138 may send signaling messages stored in database 136 to administration server 142 where a server-based protocol analysis component 144 decodes the messages and presents the messages to a user in a convenient format, such as text format. Traffic application 140 may count the number of occurrences of messages matching user-defined criteria and send the counts to administration server 142 where server-based traffic component 146 displays the counts to the user.

According to one aspect of the subject matter described herein, protocol analysis application 138 and traffic application 140 may invoke application-level protocol identifier 134 to determine the application-level protocol of each received signaling message. Application-level protocol identifier 134 may be a stand-alone application that receives messages from other applications and returns the application protocol of the message. In one implementation, application-level protocol identifier may be a library that is statically or dynamically linked into other applications, such as protocol analysis application 138 or traffic application 140.

The network monitoring functions performed by applications 138 and 140 may be controlled by an administration server 142. For example, administration server 142 may include a database 147 that stores message filter tables and a user interface 148 that allows a user to remotely invoke protocol analysis and traffic analysis applications on site collectors 132. For example, server-based protocol analysis and traffic components 144 and 146 may be used to invoke site-collector-based components 138 and 140, based on parameters input by a user via user interface 148. In order to invoke one of the applications, a user may send a query to all site collectors 132 requesting application-level signaling message data over a certain time period. Application-level protocol identifiers 134 on site collectors 132 may examine messages in databases 136, identify the application protocol and send the messages and an application protocol identifier to administration server 142 or to a data gateway server 150. Data gateway server 150 stores filtered messages in a database 152. As illustrated in FIG. 2, data gateway server 150 may include a call trace module 154 for tracing calls according to the subject matter described herein.

Database 152 may include a plurality of messages. Further, the messages stored in database 152 may be associated with a plurality of different protocols. Exemplary messages include GSM MAP messages, ISUP messages, and IP telephony signaling messages.

Figure 3:
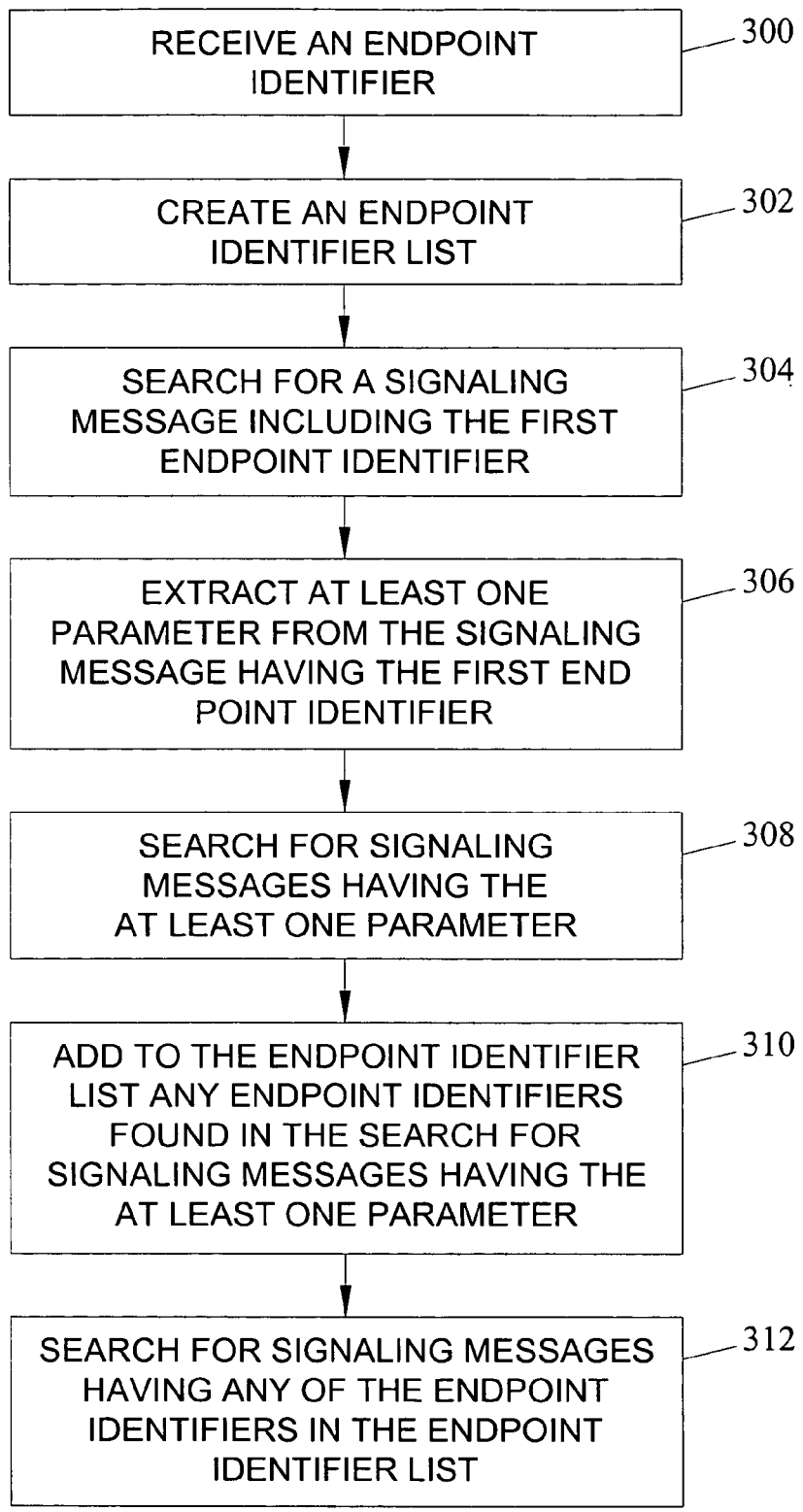
FIG. 3 is a flow chart of exemplary steps for generic call tracing according to an embodiment of the subject matter described herein.

Call trace module 154 may be invoked by a user for generically tracing a call. FIG. 3 is a flow chart illustrating exemplary steps for generic call tracing according to an embodiment of the subject matter described herein. Referring to FIG. 3, call trace module 154 may receive an endpoint identifier (step 300). For example, the endpoint identifier may be a telephone number. The endpoint identifier may be entered by a user for initiating generic tracing of a call associated with the endpoint identifier. Alternatively, endpoint identifier may be any other endpoint identifier such as a SIP URI, an instant messaging (IM) identifier, an e-mail address identifier, an Internet chat session identifier, an IP address, a mobile station international ISDN number (MSISDN), and an international mobile subscriber identity (IMSI). Next, at step 302, call trace module 154 may create an endpoint identifier list including the endpoint identifier received in step 300. The endpoint identifier list may be stored in a database 156 associated with call trace module 154.

In one embodiment, a user may select any one of the signaling message stored in database 156 for initiating a search. An endpoint identifier in the selected message may be used for initiating generic tracing of a call associated with the endpoint identifier. The endpoint identifier in the selected message may be stored in the endpoint identifier list.

At step 304, the signaling messages in database 152 may be searched for a signaling message including the endpoint identifier. In one example, the signaling message including the endpoint identifier may be a GSM MAP message. At least one parameter may be extracted from the signaling message having the endpoint identifier (step 306). The extracted parameter or parameters should be distinct from the endpoint identifier. Further, the parameter may identify a protocol associated with an endpoint identifier in the endpoint identifier list. Exemplary protocols associated with an endpoint identifier include MAP, TCAP, ISUP, and SIP. Exemplary parameters that may be used for identifying a protocol include a TCAP transaction identifier, an origination point code (OPC), a destination address code (DPC), a circuit identification code (CIC), and a routing number. Next, at step 308, database 152 may be searched for signaling messages having the parameter extracted from the signaling message having the endpoint identifier.

At step 310, call trace module 154 may add to the endpoint identifier list any endpoint identifier found in the search for signaling messages having the extracted parameter. Next, in step 312, database 152 may be searched for signaling messages having any of the endpoint identifiers in the endpoint identifier list. The search may stop when all of the signaling messages having timestamps within a predetermined timestamp range have been searched. As a result of the search, messages related to a call associated with an endpoint identifier identified by a user may be traced.

As discussed herein, call tracing includes searching signaling messages for a message having a field with a particular value. A variety of suitable techniques may be used for comparing the value with signaling message fields. The values in the messages being searched are referred to as candidates. In one example, a database may be searched for an endpoint identifier that exactly matches an endpoint identifier identified by a user and/or extracted from a signaling message in a generic call trace according to the subject matter disclosed herein. Exact matching may be used to search for fields such as ISUP CIC and TCAP Transaction ID. A number in a message's field may be, e.g., in decimal format, hexadecimal format, or binary format, based on industry conventions for that field. This type of matching requires an exact match. The candidate value must be exactly the same as the target in order to be considered a match.

In another embodiment, a database may be searched for an endpoint identifier using translation matching. In translation matching, numeric values of a field are assigned specific meanings by a protocol. For example, in the ISUP protocol, the numeric value "1" in the Message Type field of a message means that the message is an Initial Address Message (IAM). This mapping between number and text is referred to as "translation". Protocol analysis functionality may maintain translation tables for such fields. The target value may be entered as text or may be selected from menu. The text may be translated to the corresponding numeric value for matching with the candidate fields.

In another embodiment, a database may be searched based on phone number matching. In one example, a technique referred to as flexible phone number matching may used for finding a matching phone number. It may unknown whether the phone number being searched will have an area code or a country code in it. In addition, it may be unknown whether the phone number has a trailing "F" (filler or padding digit). For example, when searching for the phone number "9194605500", flexible matching may also find "4605500", "4605500F", "9194605500F", or "8184605500". When comparing numbers, the trailing "F"s in the candidate may be ignored or removed and not involved in the comparison. Further, for example, in GSM tracing, when matching an MSISDN to ISUP number, single leading zeros may be removed or ignored before comparison. Further, in one example, minimum length rules for matching may apply such that greater than half the length of a longer number must match.

A flexible matching process may be used to trace IP multimedia subsystem (IMS) network calls that have undergone ENUM translation. The process may match a candidate in E.164 format number with a reversed E.164 format number after ENUM translation. For example, if the original E.164 number is 919-380-3814 and the ENUM translated number is "4.1.8.3.0.8.3.9.1.9.e164.arpa," the flexible matching process may search for both "9193803814" and "4.1.8.3.0.8.3.9.1.9". Accordingly, the subject matter described herein can trace IMS calls and other calls that use ENUM translations of phone numbers.

In another embodiment, phone number matching may include wild card matching. Wild card matching" refers to the use of characters, such as "*" and "?" in phone number targets to replace or "stand for" some of the digits of the number. A "*" may be used to match zero or more digits of any value at that position in the number. A "?" may be used to match exactly one digit of any value at that position. For example, "919460*" may match any number that begins with the digits "919460", including "9194605500F", "9194607", and "91946". "919460*" may not match "9194705500" or "3919460". Further, for example, "460550?" may match "4605500" and "4605507", but not match "460550" or "46055127".

FIGS. 4-19 illustrate different call flow diagrams associated with a generic call trace according to the subject matter disclosed herein. The curvilinear lines connecting the various messages indicate messages that may be correlated using the same or a related parameter. The messages shown in the call flow diagrams may be stored in a database such as database 152. A user may initiate a generic call trace in database 152 by entering an endpoint identifier. Alternatively, a user may initiate a generic call trace in database 152 by selecting one of the messages in database 152. The call flow diagrams shown in FIGS. 4-19 show exemplary call trace methods for tracing calls shown in the call flow diagrams according to the subject matter disclosed herein.

Figure 4:
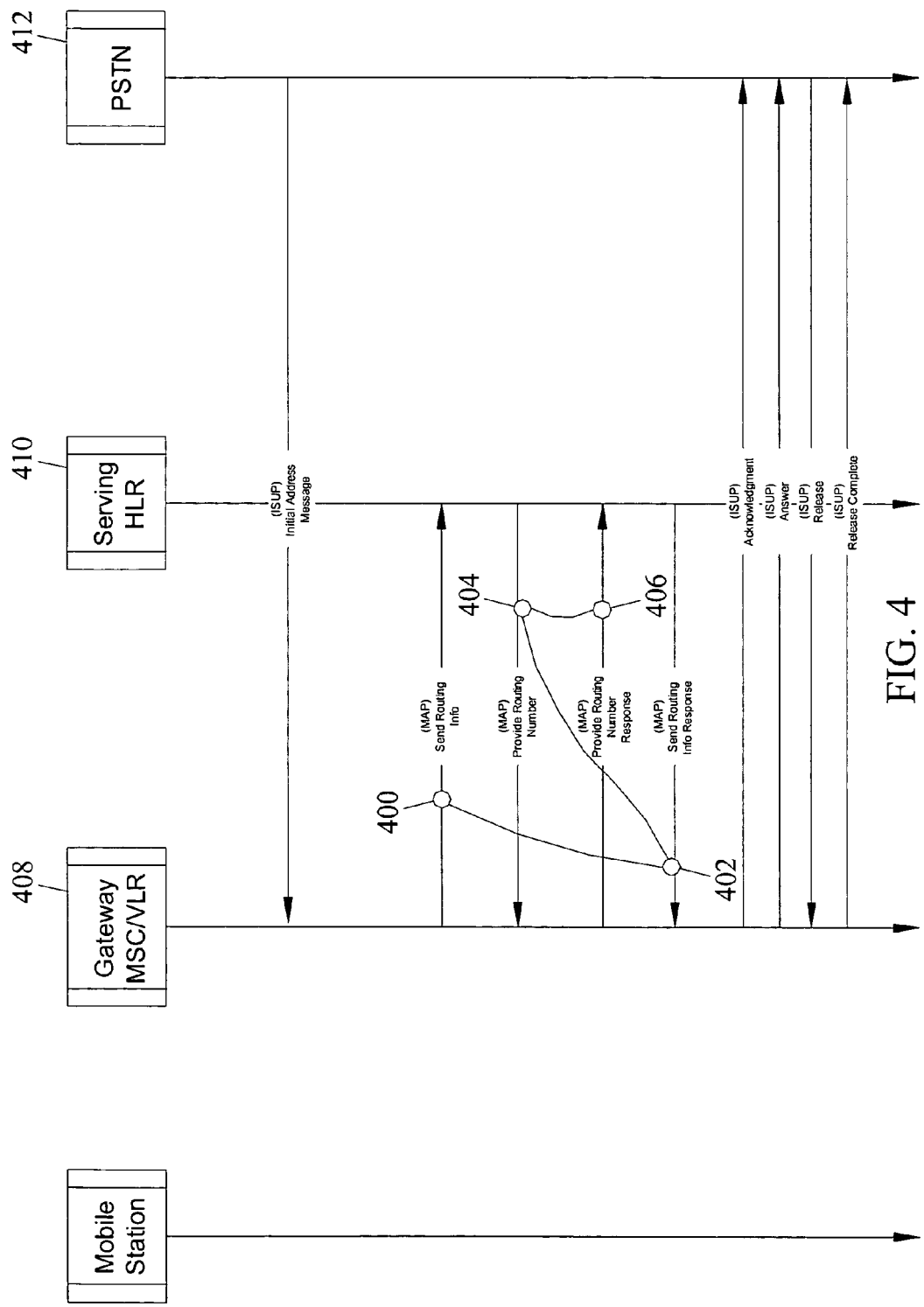
FIG. 4 is a call flow diagram of a request for routing information communication associated with a generic call trace according to the subject matter disclosed herein.

FIG. 4 illustrates a call flow diagram of a request for routing information communication associated with a generic call trace according to the subject matter disclosed herein. Referring to FIG. 4, points 400, 402, 404, and 406 connect the curvilinear lines and represent steps for tracing messages associated with the request for routing information communication: The call includes communications involving a gateway MSC/VLR 408, a serving HLR 410, and a PSTN 412. The generic call trace of the request call may be initiated when a user enters an MSISDN. Call trace module 154 may search forward and/or backward through database 152 for a signaling message including the entered MSISDN. In this example, at point 400, module 154 finds a MAP Send Routing Information message communicated from MSC/VLR 408 to HLR 410 including an MSISDN that matches the entered MSISDN. The search may be limited to signaling messages having timestamps within a predetermined timestamp range.

An endpoint identifier list may be created for the call trace. Parameters stored in the list may be used for tracing signaling messages associated with the call. For example, the MSISDN may be stored in the list and used for tracing messages. Further, module 154 may add parameters in the message at point 400 to the list. Module 154 may extract a TCAP transaction ID from the MAP Send Routing Information message and store the extracted TCAP transaction ID in the endpoint identifier list. A TCAP transaction ID may be added to the list because TCAP transaction IDs can match MAP messages associated with the same call.

Next, module 154 may search backwards and/or forwards for a signaling message including a parameter in the endpoint identifier list. In searching forward, at point 402, module 154 finds a MAP Send Routing Information Response message including a matching TCAP transaction ID. The message at point 402 may include an IMSI. Module 154 may extract the IMSI and store the IMSI in the endpoint identifier list. Module 154 may then search backwards and/or forwards for a message including parameter in the list.

At point 404, module 154 may find a MAP Provide Routing Number message including an IMSI matching the IMSI in the list. Initially, module 154 may search forward until finding a signaling message having a timestamp outside of the predetermined timestamp range. Module 154 may then search backward among the signaling messages having a timestamp within the timestamp range. A TCAP Transaction ID may be extracted from the message at point 404 and added to the list.

Next, module 154 may search forward for messages including a parameter contained in the list. At point 406, module 154 finds a MAP Provide Routing Number Response message including a matching TCAP Transaction ID. The message at point 406 includes a Provide Routing Number Response. Module 406 may add the Provide Routing Number Response parameter to the endpoint identifier list. The remaining signaling messages having timestamps within the predetermined timestamp range may be searched for parameters in the endpoint identifier list. The search may end when all signaling messages having timestamps within the predetermined timestamp range have been identified that include parameters in the list. As a result of the search, the request for routing information communication is traced.

Figure 5:
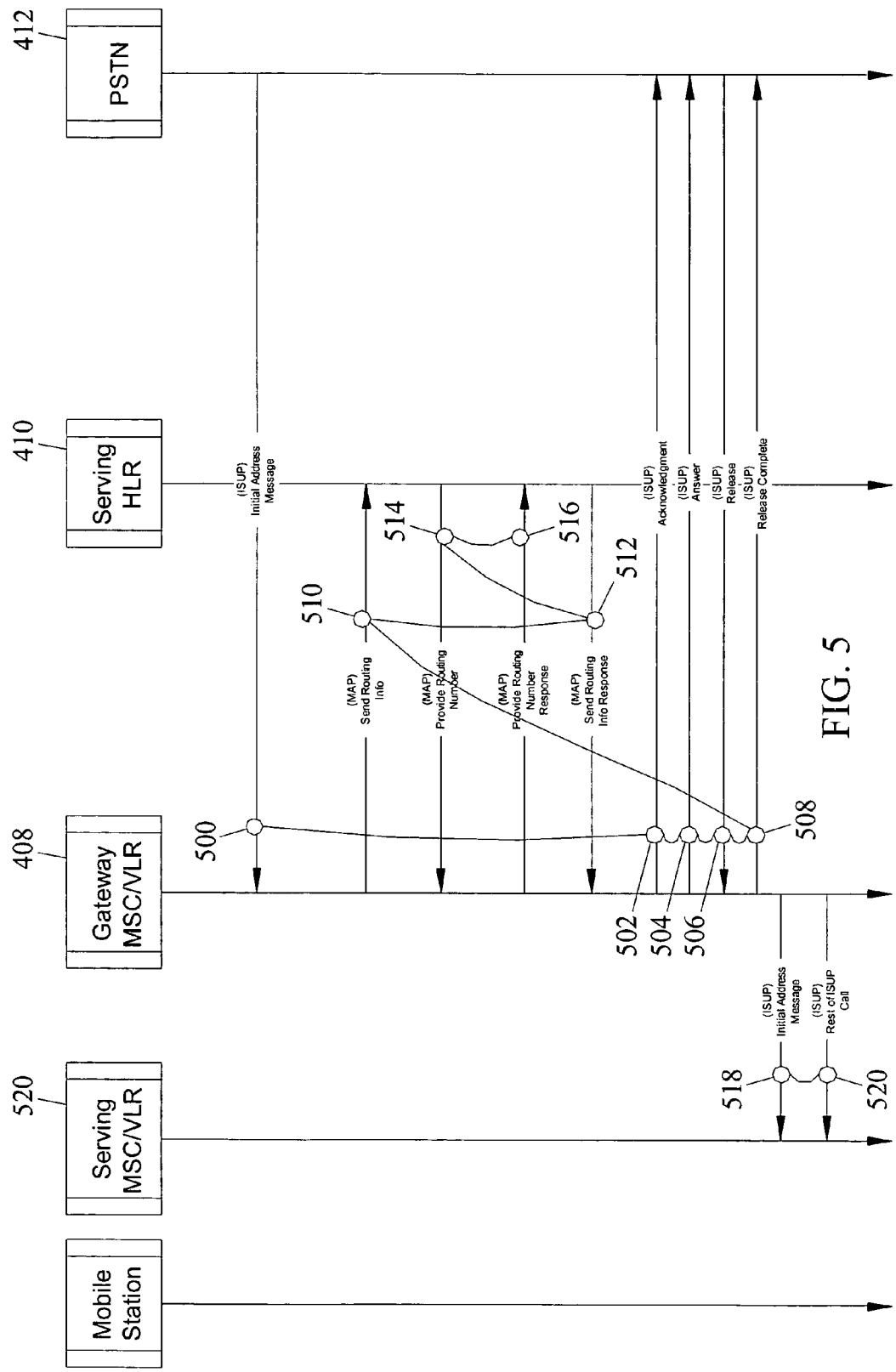
FIG. 5 is a call flow diagram of an ISUP call associated with a generic call trace according to the subject matter disclosed herein.

FIG. 5 illustrates a call flow diagram of an ISUP call associated with a generic call trace according to the subject matter disclosed herein. Referring to FIG. 5, points 500-520 connect the curvilinear lines and represent steps for tracing messages associated with the ISUP call. The ISUP call includes communications involving gateway MSC/VLR 408, serving HLR 410, PSTN 412, and a serving MSC/VLR 520. The generic call trace of the call may be initiated when a user enters an ISUP Called Party Number. Module 154 may search forward and/or backward through database 156 for a signaling message including the entered ISUP Called Party Number. In this example, at point 500, module 154 finds a PSTN Originating ISUP IAM communicated from PSTN 412 to MSC/VLR 408 including an ISUP Called Party Number that matches the entered number. The search may be limited to signaling messages having timestamps within a predetermined timestamp range.

Further, an endpoint identifier list may be created for the call trace. Parameters stored in the list may be used for tracing signaling messages associated with the call. For example, the ISUP Called Party Number may be stored in the list and used for tracing messages. Module 154 may extract a CIC, an OPC, and a DPC from the ISUP IAM at point 500 and store the extracted parameters in the endpoint identifier list. The CIC, the OPC, and the DPC may be added to the list because CICs, OPCs, and DPCs can match ISUP messages associated with the same call. Further, the message at step 500 may include a calling party number. The calling party number may be stored in the list because it can be used Next, module 154 may search for a signaling message including one or more of the parameters stored in the endpoint identifier list. In a forward search, at point 502, module 154 finds an ISUP Acknowledgment message including a matching CIC, OPC, and DPC. In a further search, at point 504, module 154 finds an ISUP Answer message including a matching CIC, OPC, and DPC. In another search, at point 506, module 154 finds an ISUP Release message including a matching CIC, OPC, and DPC. In another search, at point 508, module 154 finds an ISUP Release Complete message including a matching CIC, OPC, and DPC. Any suitable parameters may be extracted from the messages found at points 502-508 and added to the endpoint identifier list.

Next, module 154 may search backward for a signaling message including a parameter matching the parameters in the endpoint identifier list. At point 510, module 154 finds a MAP Send Routing Information message including an MSISDN matching the ISUP Called Party Number in the ISUP IAM found at point 500. The message at point 510 includes a TCAP Transaction ID. The TCAP Transaction ID may be extracted from the message and added to the endpoint identifier list.

Next, module 154 may search forward and find a MAP Send Routing Information Response message including a matching TCAP Transaction ID at point 512. The message at point 512 includes an IMSI. The IMSI may be extracted from the message and added to the endpoint identifier list.

Next, module 154 may search backward and find a MAP Provide Routing Number message including a matching IMSI at point 514. The message at point 514 includes a TCAP Transaction ID. The TCAP Transaction ID may be extracted from the message and added to the endpoint identifier list. Next, module 154 may search forward and find a MAP Provide Routing Number Response message including a matching TCAP Transaction ID at point 516.

In further searching, module 154 finds a Terminating ISUP IAM at point 514 that includes a calling party number that matches the calling party number in the originating ISUP call. Further, at point 520, module 154 may find one or more messages that are the rest of the Terminating ISUP call. The messages may include a CIC, an OPC, and a DPC that matches the CIC, the OPC, and the DPC stored in the endpoint identifier list. As a result of the search, the ISUP call is traced.

Figure 6:
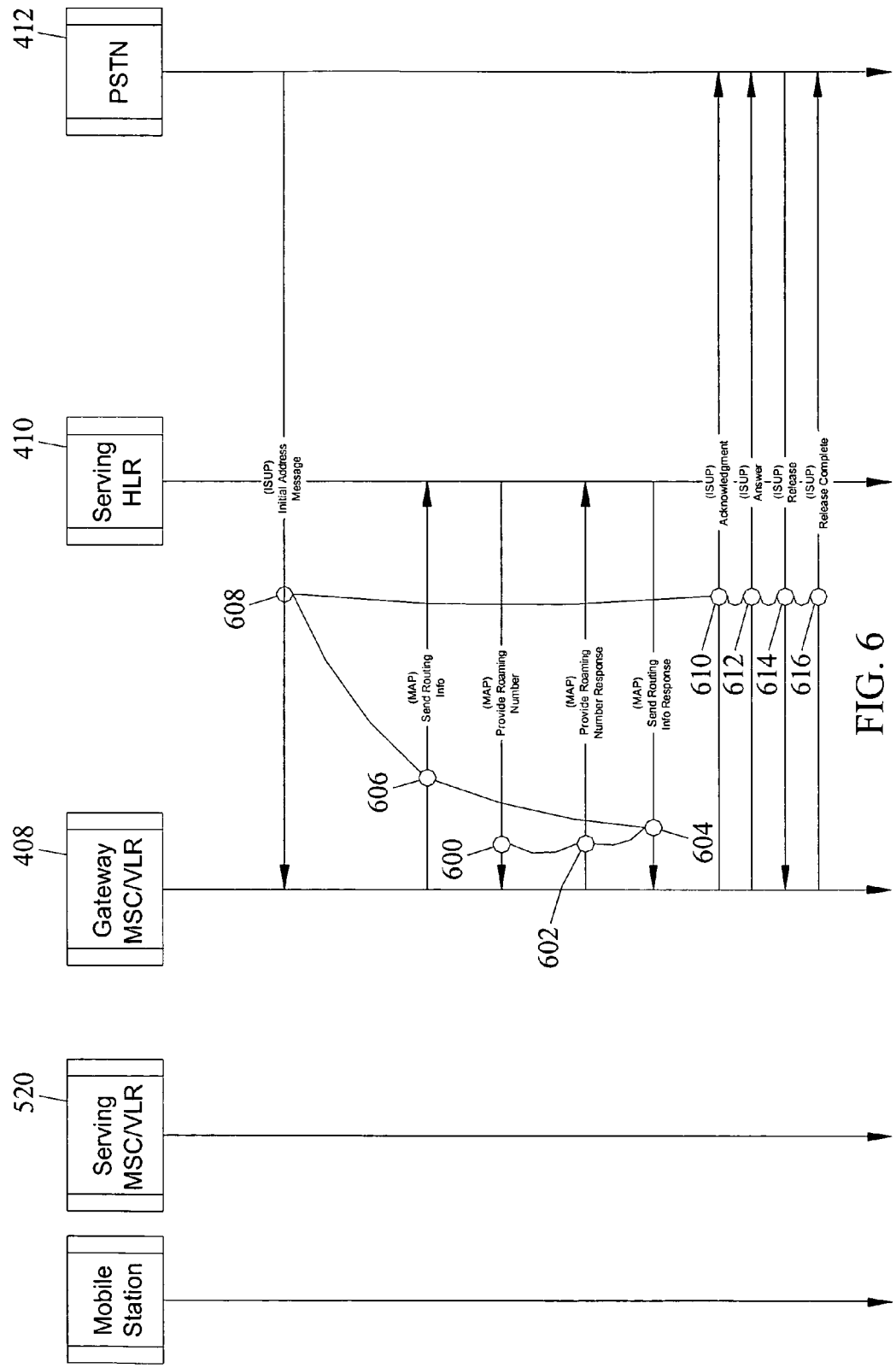
FIG. 6 is a call flow diagram of a MAP provide roaming number (PRN) operation associated with a generic call trace according to the subject matter disclosed herein.

FIG. 6 illustrates a call flow diagram of a MAP PRN operation associated with a generic call trace according to the subject matter disclosed herein. Referring to FIG. 6, points 600-616 connect the curvilinear lines and represent steps for tracing messages associated with the MAP PRN operation. The MAP PRN operation includes communications involving gateway MSC/VLR 408, serving HLR 410, and PSTN 412. The generic call trace of the operation may be initiated when a user selects a PRN operation in a buffer. Module 154 may search forward and/or backward through database 156 for a signaling message including the selected PRN operation. In this example, at point 600, module 154 finds a MAP Provide Roaming Number communication including the selected PRN operation. The search may be limited to signaling messages having timestamps within a predetermined timestamp range.

An endpoint identifier list may be created for the call trace. Parameters stored in the list for tracing signaling messages associated with the call. Module 154 may extract a TCAP Transaction ID from the PRN operation and store the extracted parameter in the endpoint identifier list.

Next, module 154 may search for a signaling message including a parameter in the list. In a forward search, at point 602, module 154 finds a MAP Send Routing Information Response message including a matching TCAP Transaction ID. The message at point 602 includes a roaming number. The roaming number may be extracted from the message and added to the endpoint identifier list. Next, module 154 may search forward and find a MAP Send Routing Information Response message including a matching Roaming number at point 604. Next, module 154 may search backward and find a MAP Send Routing Information message including a matching TCAP Transaction ID at point 606.

At point 608, module 154 may find the originating ISUP IAM call message including the called party number matching the roaming number in the MAP Provide Roaming Number Response message at point 602. The CIC, OPC, and DPC may be extracted from the message and stored in the endpoint identifier list.

Next, the CIC, OPC, and DPC stored in the endpoint identifier list may be used to find the other of the messages of the originating ISUP call. The other message may include an ISUP Acknowledgment message at point 610, an ISUP Answer message at point 612, an ISUP Release message at point 614, and an ISUP Release Complete message at point 616. As a result of the search, the ISUP call is traced.

Figure 7:
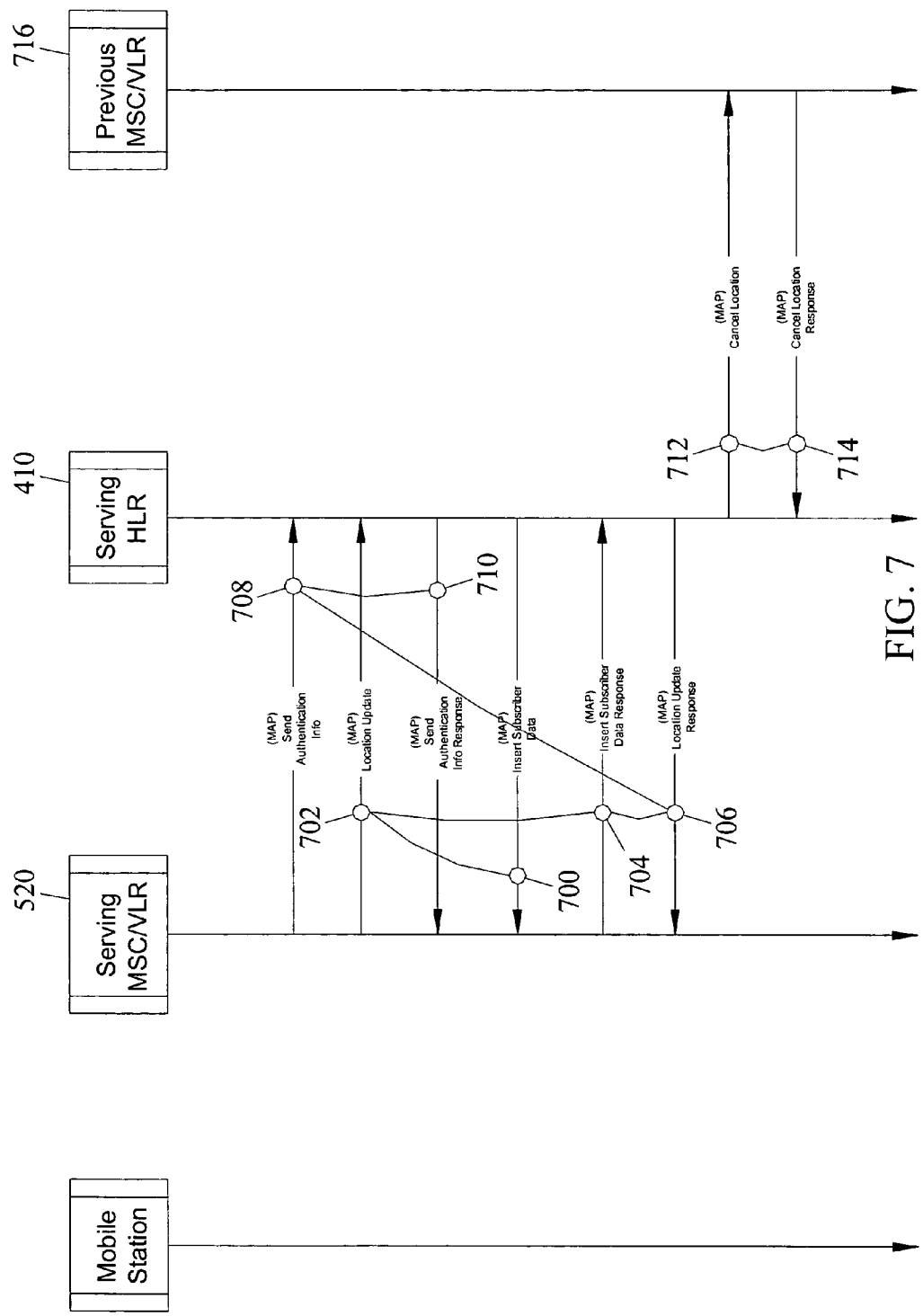
FIG. 7 is a call flow diagram of a MAP location update (LUP) operation associated with a generic call trace according to the subject matter disclosed herein.

FIG. 7 illustrates a call flow diagram of a MAP LUP operation associated with a generic call trace according to the subject matter disclosed herein. Referring to FIG. 7, points 700-714 connect the curvilinear lines and represent steps for tracing messages associated with the MAP LUP operation. The MAP LUP operation includes communications involving serving MSC/VLR 520, serving HLR 410, and a previous MSC/VLR 716. The generic call trace of the operation may be initiated when a user enters an MSISDN. Module 154 may search forward and/or backward through database 156 for a signaling message including the MSISDN. In this example, at point 700, module 154 finds a MAP Insert Subscriber Data Operation message including the MSISDN. The search may be limited to signaling messages having timestamps within a predetermined timestamp range.

An endpoint identifier list may be created for the call trace. Module 154 may use parameters stored in the list for tracing signaling messages associated with the call. Module 154 may extract a TCAP Transaction ID from the MAP Insert Subscriber Data Operation message at point 700 and store the extracted parameter in the endpoint identifier list.

Next, module 154 may search for a signaling message including the TCAP Transaction ID. In a backward search, at point 702, module 154 finds a MAP Location Update message including a matching TCAP Transaction ID. The MAP Location Update message may include an IMSI. Module may store the IMSI in the endpoint identifier list. Further, module 154 may search forward and find a MAP Insert Subscriber Data Response message at point 704 and a MAP Location Update Response message at point 706.

Next, in a backward search, module 154 finds a MAP Send Authentication Information message at point 708. The message includes an IMSI that matches the IMSI from the message at point 702. In a forward search, module 154 may find a MAP Send Authentication Information Response message including a matching TCAP Transaction ID at point 710.

In a forward search, module 154 finds a MAP Cancel Location message including a matching IMSI from the message at point 702. Further, module 154 may find a MAP Cancel Location Response message including a matching TCAP Transaction ID at point 714. The messages at points 712 and 714 are an exchange between serving HLR 410 and previous MSC/VLR 716 for canceling location operations with a phone.

Figure 8:
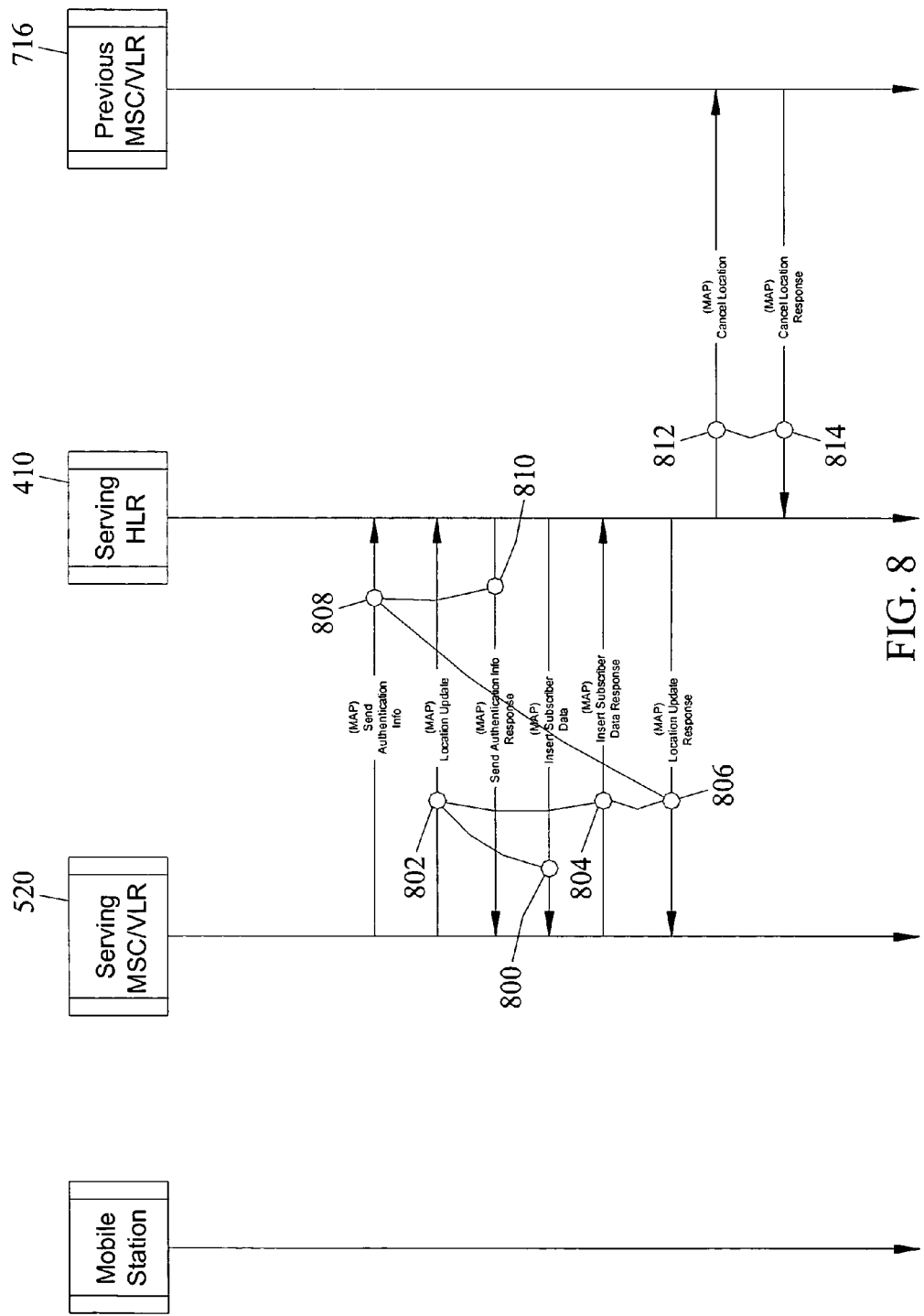
FIG. 8 is a call flow diagram of another MAP LUP operation associated with a generic call trace according to the subject matter disclosed herein.

FIG. 8 illustrates a call flow diagram of another MAP LUP operation associated with a generic call trace according to the subject matter disclosed herein. Referring to FIG. 8, points 800-814 connect the curvilinear lines and represent steps for tracing messages associated with the MAP LUP operation. The MAP LUP operation includes communications involving serving MSC/VLR 520, serving HLR 410, and previous MSC/VLR 716. The generic call trace of the operation may be initiated when a user selects any message in database 156. Module 154 may search forward and/or backward through database 156 for a MAP Insert Subscriber Data Operation message having the closest date and/or time stamp to the selected message. In this example, module 154 finds a MAP Insert Subscriber Data Operation message at point 800. The search may be limited to signaling messages having timestamps within a predetermined timestamp range.

An endpoint identifier list may be created for the call trace. Module 154 may use parameters stored in the list for tracing signaling messages associated with the call. Module 154 may extract a TCAP Transaction ID from the MAP Insert Subscriber Data Operation message and store the extracted parameter in the endpoint identifier list.

Next, module 154 may search for a signaling message including the TCAP Transaction ID in the endpoint identifier list. In a backward search, at point 802, module 154 may find a MAP Location Update message including a matching TCAP Transaction ID. The MAP Location Update message may include an IMSI. Module may store the IMSI in the endpoint identifier list. Further, the TCAP Transaction ID may be used to find a MAP Insert Subscriber Data Response message at point 804 and a MAP Location Update Response message at point 806.

Next, in a backward search, module 154 finds a MAP Send Authentication Information message at point 808. The message includes an IMSI that matches the IMSI from the message at point 802. In a forward search, module 154 may find a MAP Send Authentication Information Response message including a matching TCAP Transaction ID at point 810.

In a forward search, module 154 finds a MAP Cancel Location Operation message at point 812 using the IMSI in the message at point 802. Further, module 154 finds a MAP Cancel Location Response message at point 814 using the TCAP Transaction ID in the endpoint identifier list. As a result of the search, the MAP LUP operation is traced.

Figure 9:
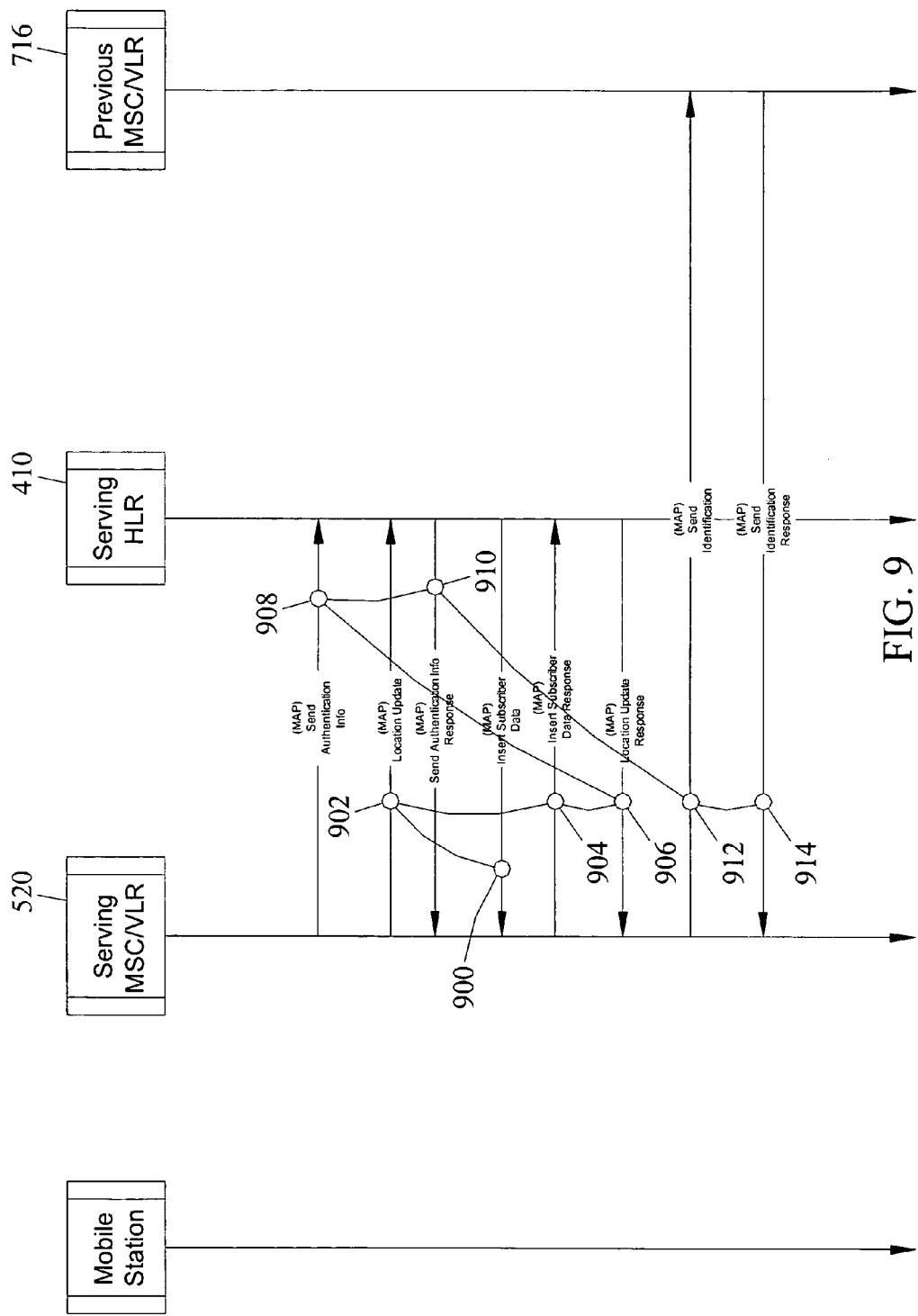
FIG. 9 is a call flow diagram of another MAP LUP operation associated with a generic call trace according to the subject matter disclosed herein.

FIG. 9 illustrates a call flow diagram of another MAP LUP operation associated with a generic call trace according to the subject matter disclosed herein. Referring to FIG. 9, points 900-914 connect the curvilinear lines and represent steps for tracing messages associated with the MAP LUP operation. The MAP LUP operation includes communications involving serving MSC/VLR 520, serving HLR 410, and previous MSC/VLR 716. The generic call trace of the operation may be initiated when a user selects any message in database 156. Module 154 may search forward and/or backward through database 156 for a MAP Insert Subscriber Data Operation message having the closest date and/or time stamp to the selected message. In this example, module 154 finds a MAP Insert Subscriber Data Operation message at point 900. The search may be limited to signaling messages having timestamps within a predetermined timestamp range.

An endpoint identifier list may be created for the call trace. Module 154 may use parameters stored in the list for tracing signaling messages associated with the call. Module 154 may extract a TCAP Transaction ID from the MAP Insert Subscriber Data Operation message and store the extracted parameter in the endpoint identifier list.

Next, module 154 may search for a signaling message including the TCAP Transaction ID in the endpoint identifier list. In a backward search, at point 902, module 154 may find a MAP Location Update message including a matching TCAP Transaction ID. The MAP Location Update message may include an IMSI. Module may store the IMSI in the endpoint identifier list. Further, the TCAP Transaction ID may be used to find a MAP Insert Subscriber Data Response message at point 904 and a MAP Location Update Response message at point 906.

Next, in a backward search, module 154 finds a MAP Send Authentication Information message at point 908. The message includes an IMSI that matches the IMSI from the message at point 802. In a forward search, module 154 may find a MAP Send Authentication Information Response message including a matching TCAP Transaction ID at point 910.

In a forward search, module 154 finds a MAP Send Identification message at point 912 using the IMSI in the message at point 902. Further, module 154 finds a MAP Send Identification Response message at point 914 using the TCAP Transaction ID in the endpoint identifier list. As a result of the search, the MAP LUP operation is traced.

Figure 10:
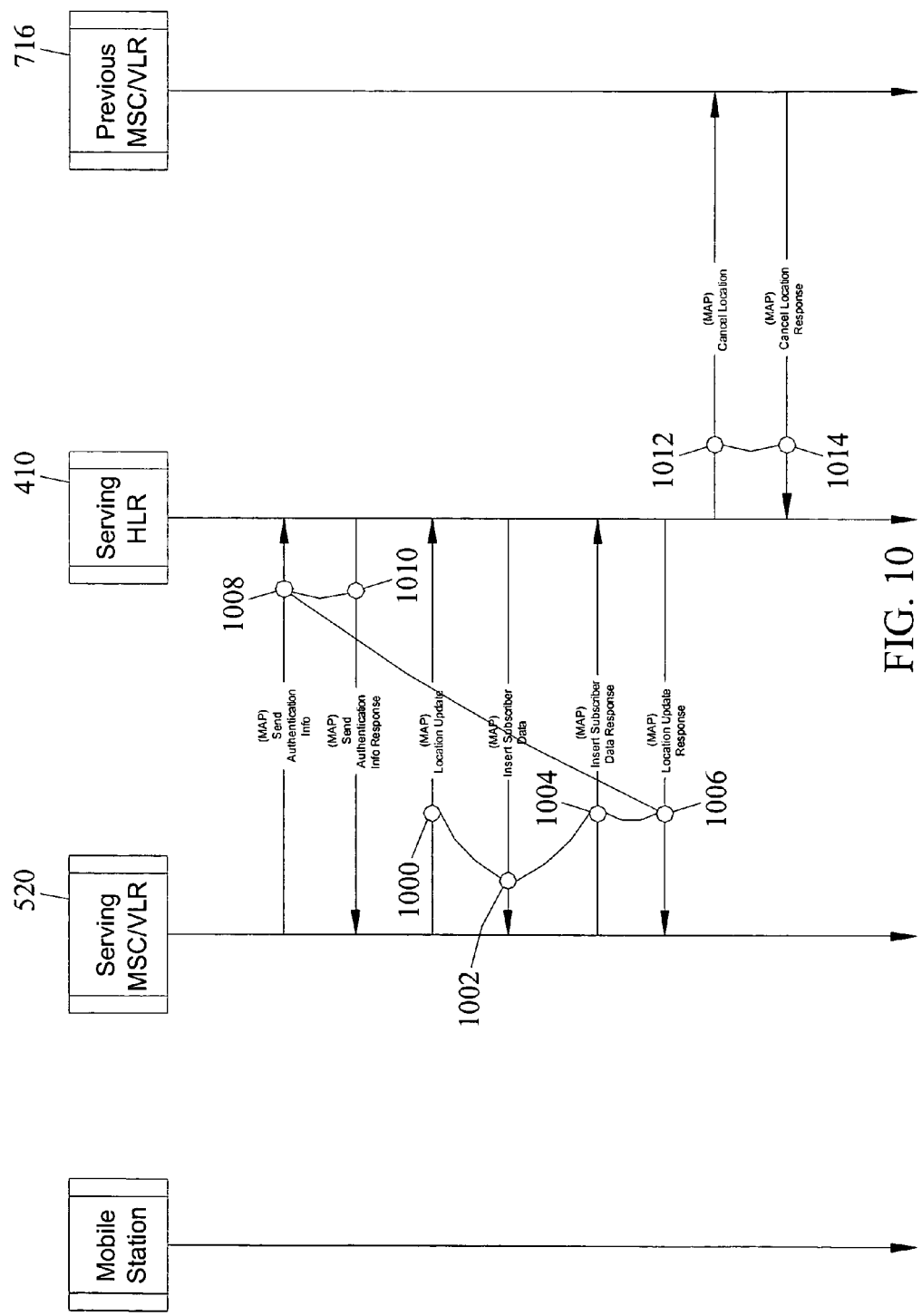
FIG. 10 is a call flow diagram of another MAP LUP operation associated with a generic call trace according to the subject matter disclosed herein.

FIG. 10 illustrates a call flow diagram of another MAP LUP operation associated with a generic call trace according to the subject matter disclosed herein. Referring to FIG. 10, points 1000-1014 connect the curvilinear lines and represent steps for tracing messages associated with the MAP LUP operation. The MAP LUP operation includes communications involving serving MSC/VLR 520, serving HLR 410, and previous MSC/VLR 716. The generic call trace of the operation may be initiated when a user enters an IMSI. Module 154 may search forward and/or backward through database 156 for a message including the entered IMSI. In this example, module 154 finds a MAP Location Update message at point 1000. The search may be limited to signaling messages having timestamps within a predetermined timestamp range.

An endpoint identifier list may be created for the call trace. Module 154 may use parameters stored in the list for tracing signaling messages associated with the call. Module 154 may extract a TCAP Transaction ID and an IMSI from the MAP LUP Operation message and store the extracted parameters in the endpoint identifier list.

Next, module 154 may search for a signaling message including the TCAP Transaction ID in the endpoint identifier list. In a forward search, module 154 may find a MAP Insert Subscriber Data message at point 1002, a MAP Insert Subscriber Data Response message at point 1004, a MAP Location Update Response message at point 1006 using the TCAP Transaction ID.

In a forward search, module 154 may find a MAP Send Authentication Information message at point 1008, a MAP Send Authentication Information Response message at point 1010, a MAP Cancel Location message at point 1012, and a MAP Cancel Location Response message at point 1014. The message at point 1008 may be found using the IMSI in the endpoint identifier list. The message at point 1010 may be found using the TCAP Transaction ID in the list. The message at point 1012 may be found using the IMSI in the list. The message at point 1014 may be found using the TCAP Transaction ID in the list. As a result of the search, the MAP LUP operation is traced.

Figure 11:
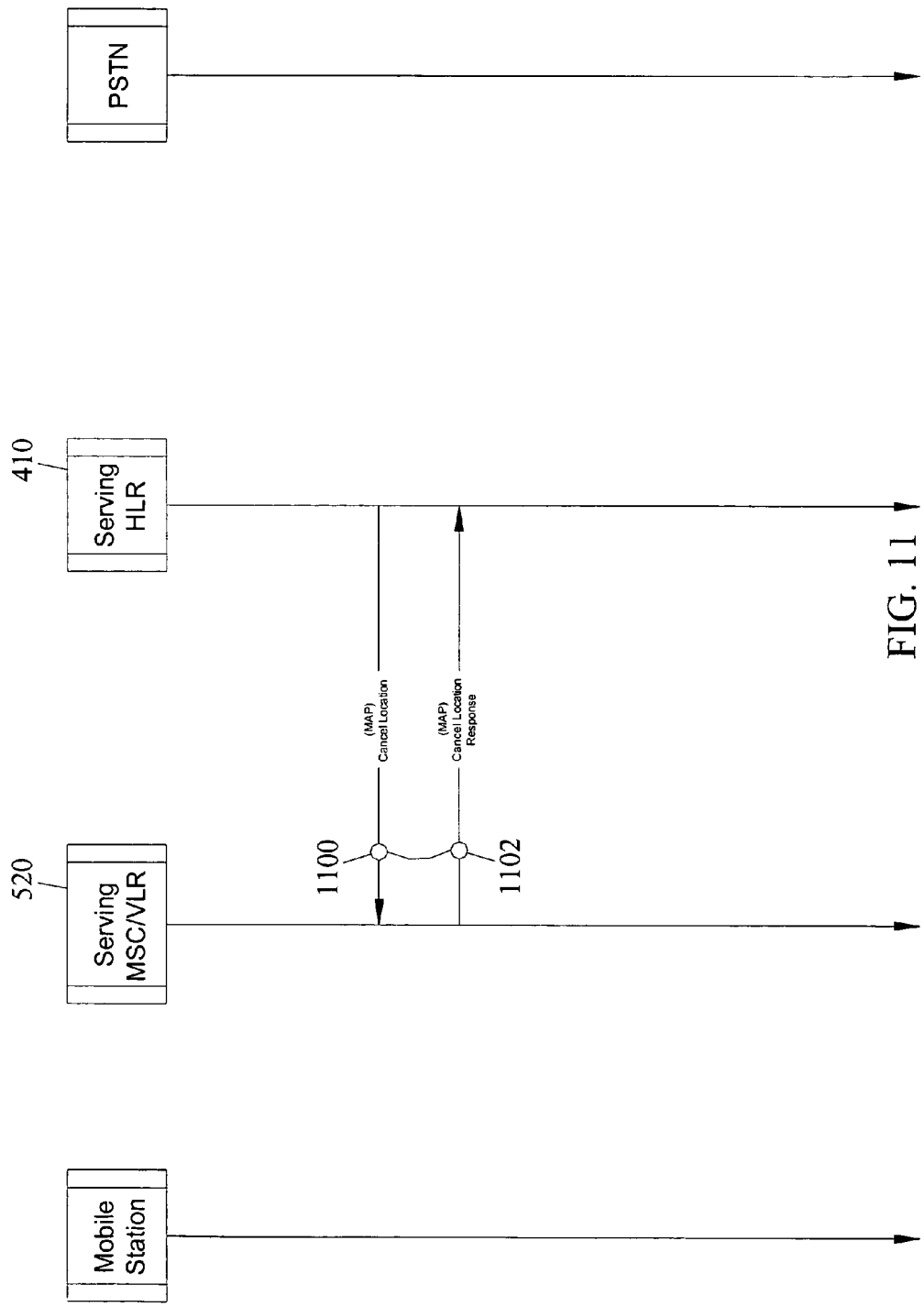
FIG. 11 is a call flow diagram of a MAP cancel location operation associated with a generic call trace according to the subject matter disclosed herein.

FIG. 11 illustrates a call flow diagram of a MAP cancel location operation associated with a generic call trace according to the subject matter disclosed herein. Referring to FIG. 11, points 1100 and 1102 connect the curvilinear lines and represent steps for tracing messages associated with the MAP cancel location operation. The MAP cancel location operation includes communications involving MSC/VLR 520 and serving HLR 410. An operator may begin the trace by selecting a particular message for initiating the trace. Module 154 may search forward and/or backward through database 156 for a MAP Cancel Location message having the closest date and/or time stamp to the selected message. In this example, module 154 finds a MAP Cancel Location message at point 1100. The search may be limited to signaling messages having timestamps within a predetermined timestamp range.

An endpoint identifier list may be created for the call trace. Module 154 may extract a TCAP Transaction ID from the MAP Cancel Location message and store the extracted parameter in the endpoint identifier list.

Next, module 154 may search for a signaling message including the TCAP Transaction ID in the endpoint identifier list. In a forward search, at point 1102, module 154 may find a MAP Cancel Location message including a matching TCAP Transaction ID. As a result of the search, the MAP cancel location operation is traced.

Figure 12:
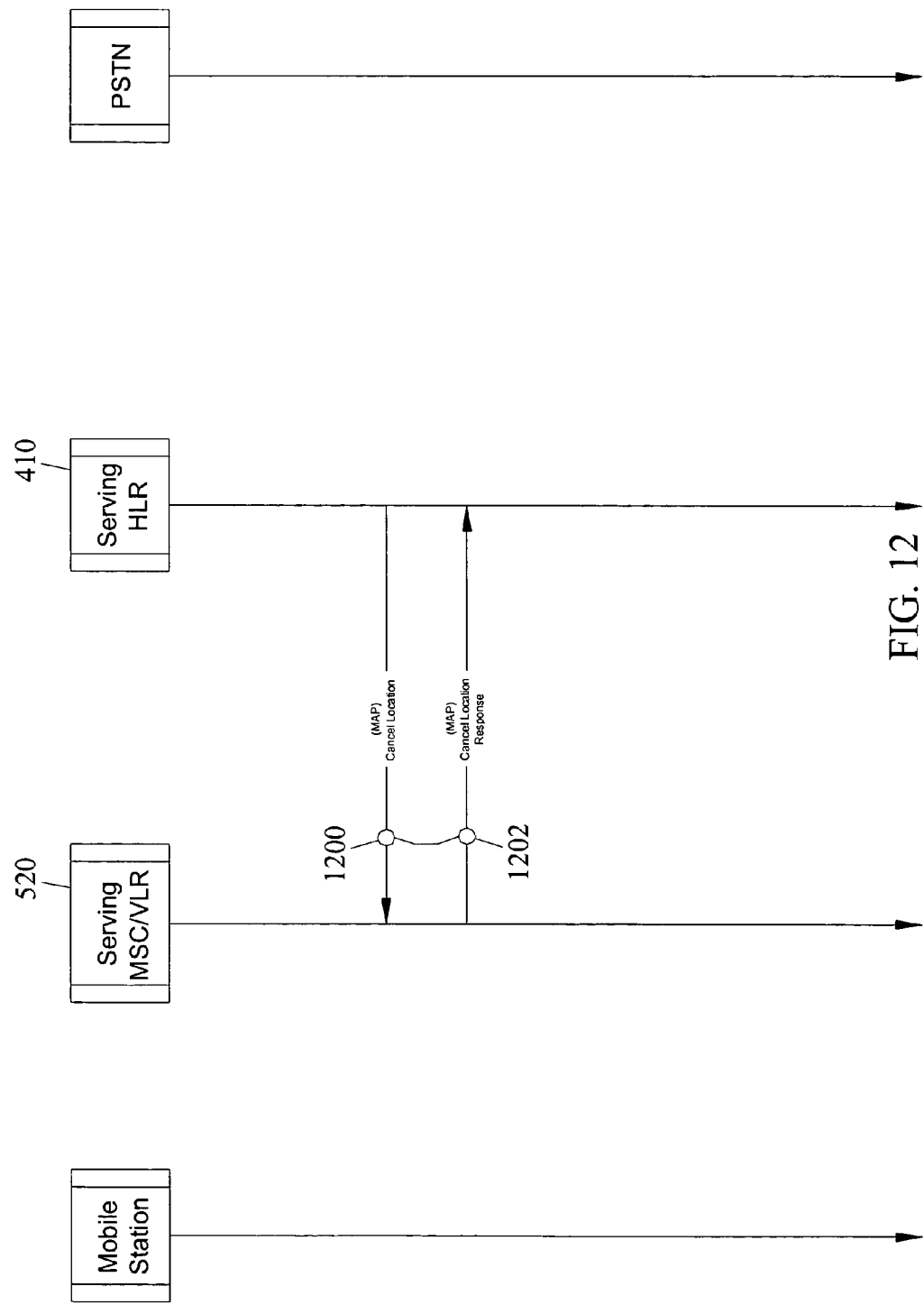
FIG. 12 is another call flow diagram of a MAP cancel location operation associated with a generic call trace according to the subject matter disclosed herein.

FIG. 12 illustrates another call flow diagram of a MAP cancel location operation associated with a generic call trace according to the subject matter disclosed herein. Referring to FIG. 12, points 1200 and 1202 connect the curvilinear lines and represent steps for tracing messages associated with the MAP cancel location operation. The MAP cancel location operation includes communications involving MSC/VLR 520 and serving HLR 410. An operator may begin the trace by entering an IMSI. Module 154 may search forward and/or backward through database 156 for a message having the entered IMSI. In this example, module 154 finds a MAP Cancel Location message at point 1200. The search may be limited to signaling messages having timestamps within a predetermined timestamp range.

An endpoint identifier list may be created for the call trace. Module 154 may extract a TCAP Transaction ID from the MAP Cancel Location message and store the extracted parameter in the endpoint identifier list.

Next, module 154 may search for a signaling message including the TCAP Transaction ID in the endpoint identifier list. In a forward search, at point 1202, module 154 may find a MAP Cancel Location message including a matching TCAP Transaction ID. As a result of the search, the MAP cancel location operation is traced.

Figure 13:
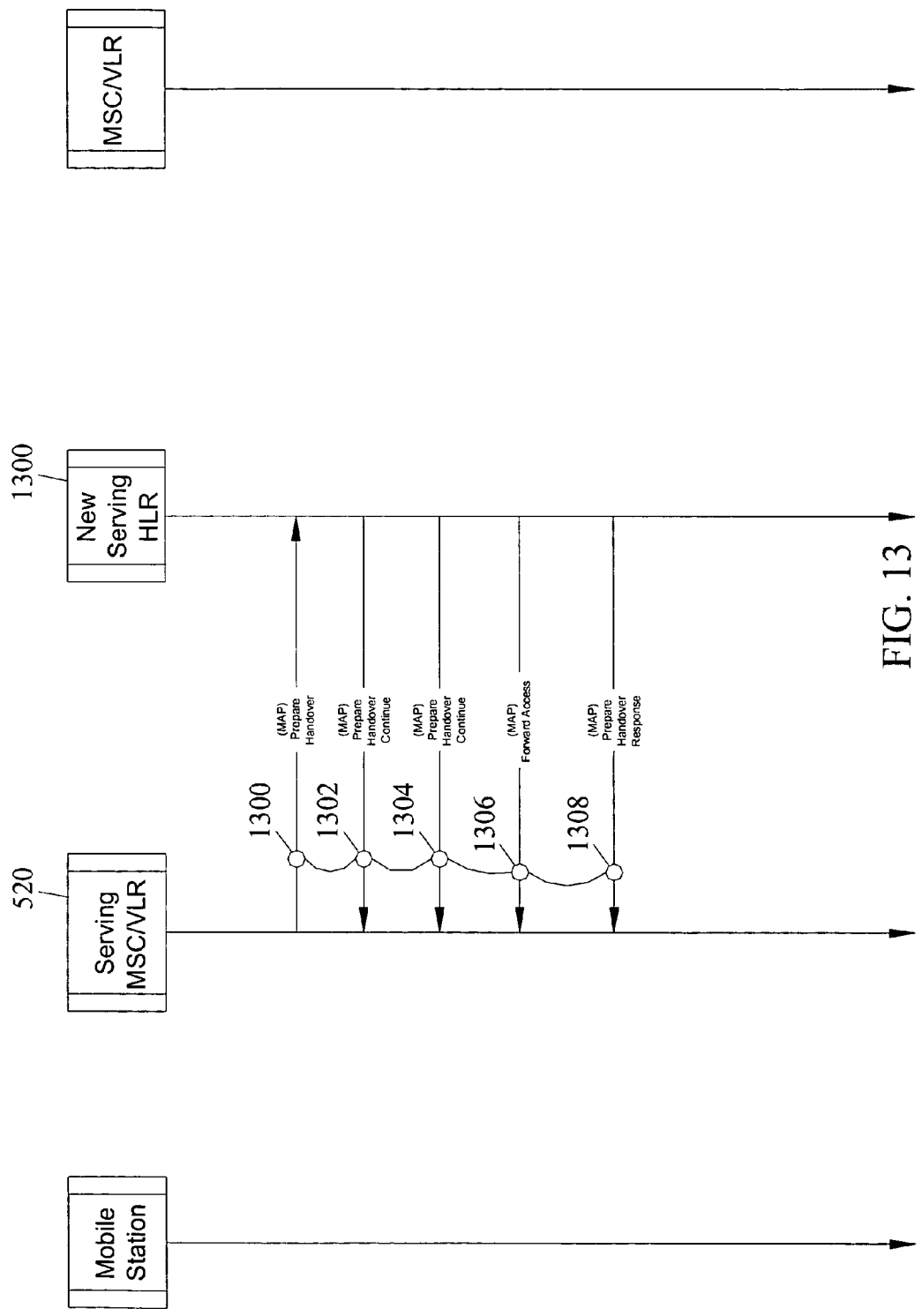
FIG. 13 is a call flow diagram of a MAP handover operation associated with a generic call trace according to the subject matter disclosed herein.

FIG. 13 illustrates a call flow diagram of a MAP handover operation associated with a generic call trace according to the subject matter disclosed herein. Referring to FIG. 13, points 1300-1308 connect the curvilinear lines and represent steps for tracing messages associated with the MAP LUP operation. The MAP handover operation includes communications involving serving MSC/VLR 520 and a new serving MSC/VLR 1300. The generic call trace of the operation may be initiated when a user selects a message in database 156. Module 154 may search forward and/or backward through database 156 for a MAP Prepare Handover Operation message having the closest date and/or time stamp to the selected message. In this example, module 154 finds a MAP Prepare Handover message at point 1300. The search may be limited to signaling messages having timestamps within a predetermined timestamp range.

An endpoint identifier list may be created for the call trace. Module 154 may use parameters stored in the list for tracing signaling messages associated with the call. Module 154 may extract a TCAP Transaction ID from the MAP Prepare Handover message and store the extracted parameter in the endpoint identifier list.

In a forward search, module 154 finds a MAP Send Identification message at point 1302 using the TCAP Transaction ID in the message at point 1300. Further, module 154 finds a MAP Prepare Handover Continue message at point 1304, a MAP Forward Access message at point 1306, and a MAP Prepare Handover Response message at point 1308. As a result of the search, the MAP Prepare Handover operation is traced.

Figure 14:
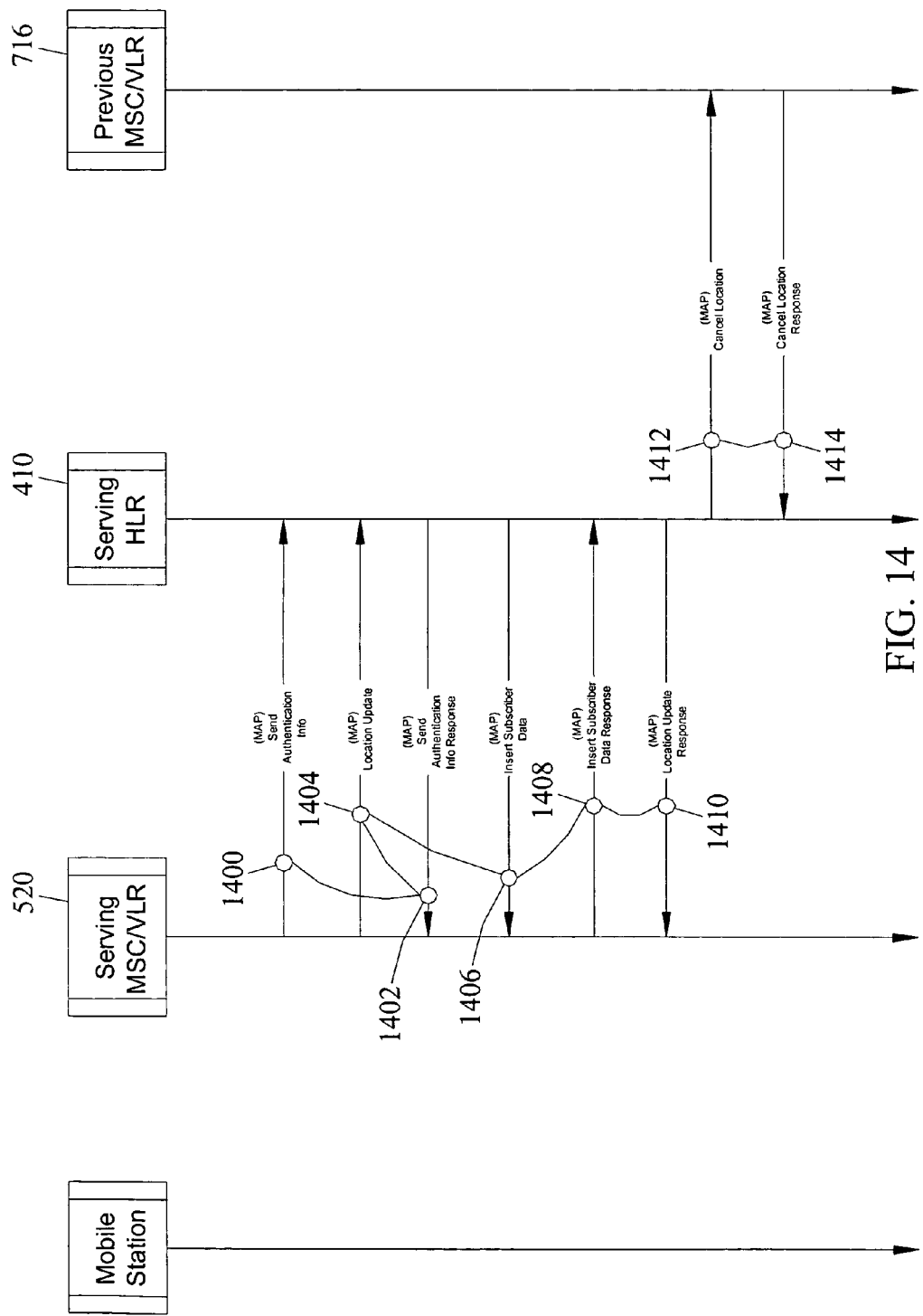
FIG. 14 is a call flow diagram of a MAP authentication information operation associated with a generic call trace according to the subject matter disclosed herein.

FIG. 14 illustrates a call flow diagram of a MAP authentication information operation associated with a generic call trace according to the subject matter disclosed herein. Referring to FIG. 14, points 1400-1414 connect the curvilinear lines and represent steps for tracing messages associated with the MAP authentication information operation. The MAP authentication information operation includes communications involving serving MSC/VLR 520, serving HLR 410, and previous MSC/VLR 716. The generic call trace of the operation may be initiated when a user enters an IMSI. Module 154 may search forward and/or backward through database 156 for a message including the entered IMSI. In this example, module 154 finds a MAP Send Authentication Information message at point 1400. The search may be limited to signaling messages having timestamps within a predetermined timestamp range.

An endpoint identifier list may be created for the call trace. Module 154 may use parameters stored in the list for tracing signaling messages associated with the call. Module 154 may extract a TCAP Transaction ID from the MAP authentication information Operation message and store the extracted parameter in the endpoint identifier list.

Next, module 154 may search for a signaling message including the TCAP Transaction ID in the endpoint identifier list. In a forward search, module 154 may find a MAP Send Authentication Information Response message at point 1402. In a backward search, module 154 may find a MAP Location Update message at point 1404. The message at point 1404 may be found using the IMSI in the endpoint identifier list.

In a forward search, module 154 may find a MAP Insert Subscriber Data message at point 1406, a MAP Insert Subscriber Data Response message at 1408, and a MAP Location Update Response message at point 1410. The messages at points 1406, 1408, and 1410 may be found using the TCAP Transaction ID in the list.

Further, in a forward search, module 154 may find a MAP Cancel Location message at point 1412 and a MAP Cancel Location Response message at point 1414. The messages at points 1412 and 1414 may be found using the TCAP Transaction ID in the list. As a result of the search, the MAP authentication information operation is traced.

Figure 15:
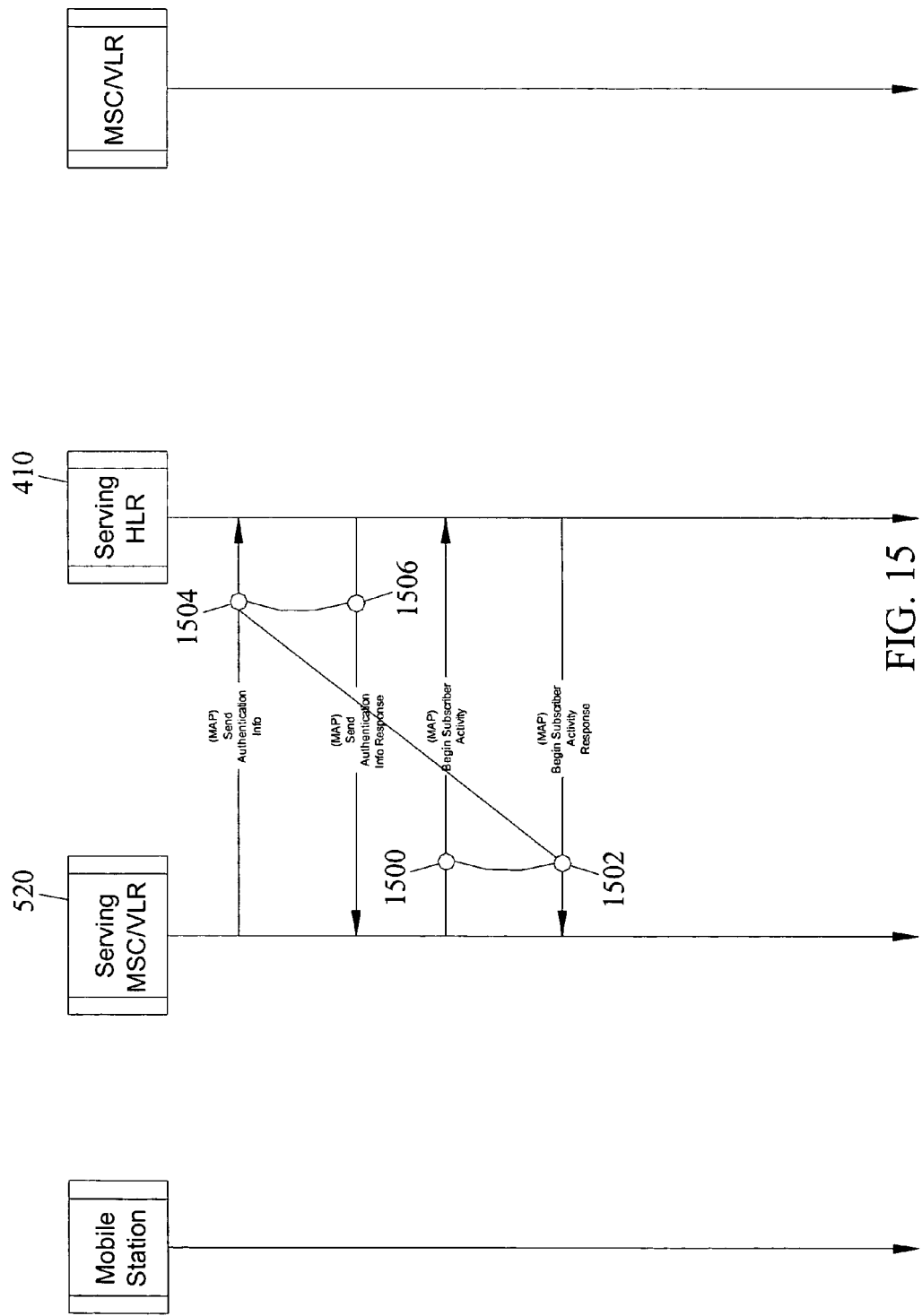
FIG. 15 is a call flow diagram of a call forwarding activation/deactivation operation associated with a generic call trace according to the subject matter disclosed herein.

FIG. 15 illustrates a call flow diagram of a call forwarding activation/deactivation operation associated with a generic call trace according to the subject matter disclosed herein. Referring to FIG. 15, points 1500-1506 connect the curvilinear lines and represent steps for tracing messages associated with the MAP authentication information operation. The call forwarding activation/deactivation operation includes communications involving serving MSC/VLR 520 and serving HLR 410. The generic call trace of the operation may be initiated when a user enters an IMSI. Module 154 may search forward and/or backward through database 156 for a message including the entered IMSI. In this example, module 154 finds a MAP Begin Subscriber Activity message at point 1500. The search may be limited to signaling messages having timestamps within a predetermined timestamp range.

An endpoint identifier list may be created for the call trace. Module 154 may use parameters stored in the list for tracing signaling messages associated with the call. Module 154 may extract a TCAP Transaction ID from the MAP Begin Subscriber Activity Operation message and store the extracted parameter in the endpoint identifier list.

Next, module 154 may search for a signaling message including the TCAP Transaction ID in the endpoint identifier list. In a forward search, module 154 may find a MAP Begin Subscriber Activity Response message at point 1502. In a backward search, module 154 may find a MAP Send Authentication Information message at point 1504. The message at point 1504 may be found using the IMSI in the endpoint identifier list. Further, module 154 may find a MAP Send Authentication Information Response message at point 1506 using the TCAP Transaction ID stored in the list. As a result of the search, the call flow diagram of a call forwarding activation/deactivation operation is traced.

Figure 16:
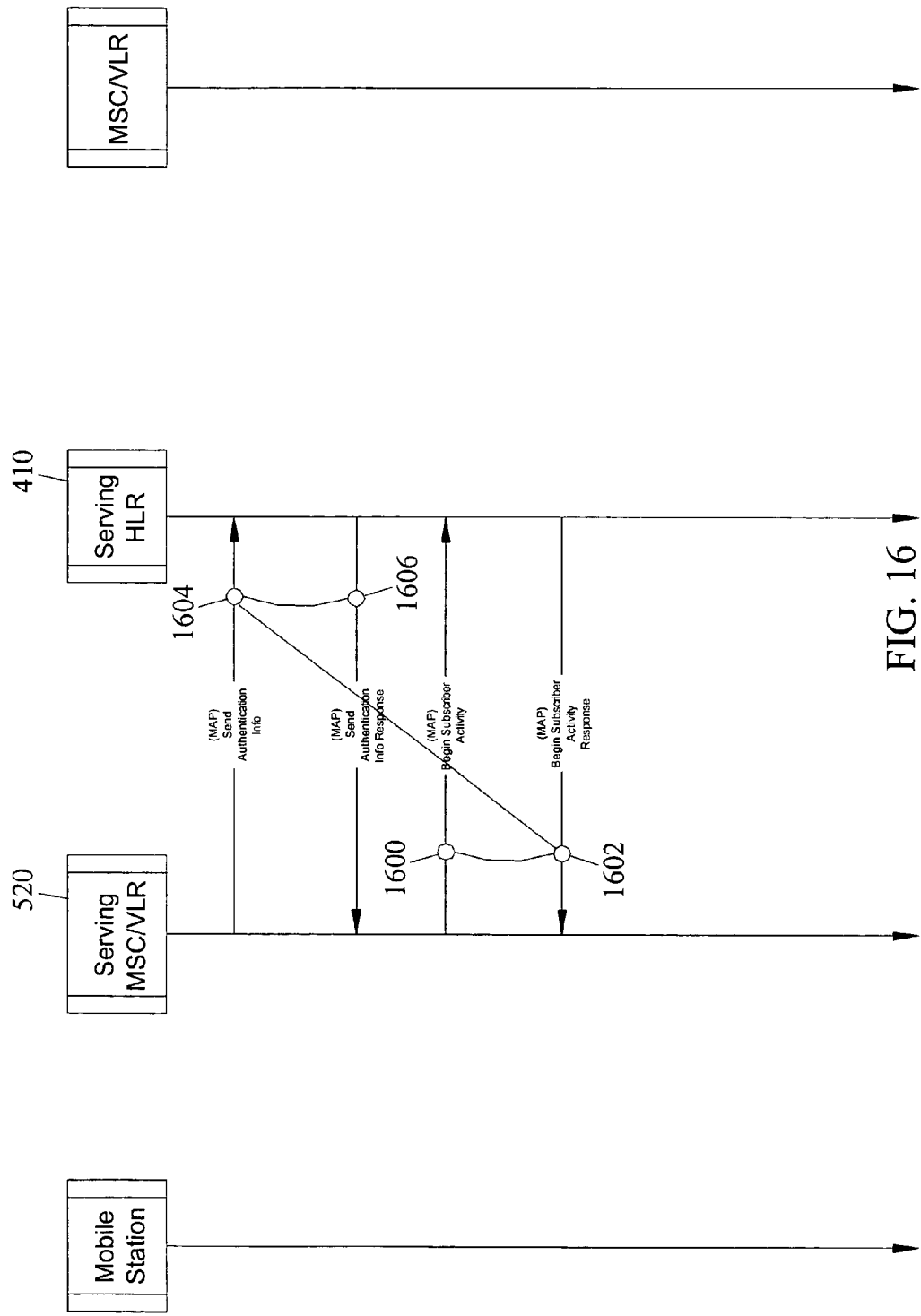
FIG. 16 is a call flow diagram of another call forwarding activation/deactivation operation associated with a generic call trace according to the subject matter disclosed herein.

FIG. 16 illustrates a call flow diagram of another call forwarding activation/deactivation operation associated with a generic call trace according to the subject matter disclosed herein. Referring to FIG. 16, points 1600-1606 connect the curvilinear lines and represent steps for tracing messages associated with the MAP authentication information operation. The call forwarding activation/deactivation operation includes communications involving serving MSC/VLR 520 and serving HLR 410. The generic call trace of the operation may be initiated when a user selects a message in database 156. Module 154 may search forward and/or backward through database 156 for a MAP Begin Subscriber Activity Operation message having the closest date and/or time stamp to the selected message. In this example, module 154 finds a MAP Begin Subscriber Activity message at point 1600. The search may be limited to signaling messages having timestamps within a predetermined timestamp range.

An endpoint identifier list may be created for the call trace. Module 154 may use parameters stored in the list for tracing signaling messages associated with the call. Module 154 may extract a TCAP Transaction ID from the MAP Begin Subscriber Activity Operation message and store the extracted parameter in the endpoint identifier list.

Next, module 154 may search for a signaling message including the TCAP Transaction ID in the endpoint identifier list. In a forward search, module 154 may find a MAP Begin Subscriber Activity Response message at point 1502. In a backward search, module 154 may find a MAP Send Authentication Information message at point 1604. The message at point 1604 may be found using the IMSI in the endpoint identifier list. Further, module 154 may find a MAP Send Authentication Information Response message at point 1606 using the TCAP Transaction ID stored in the list. As a result of the search, the call flow diagram of a call forwarding activation/deactivation operation is traced.

Figure 17:
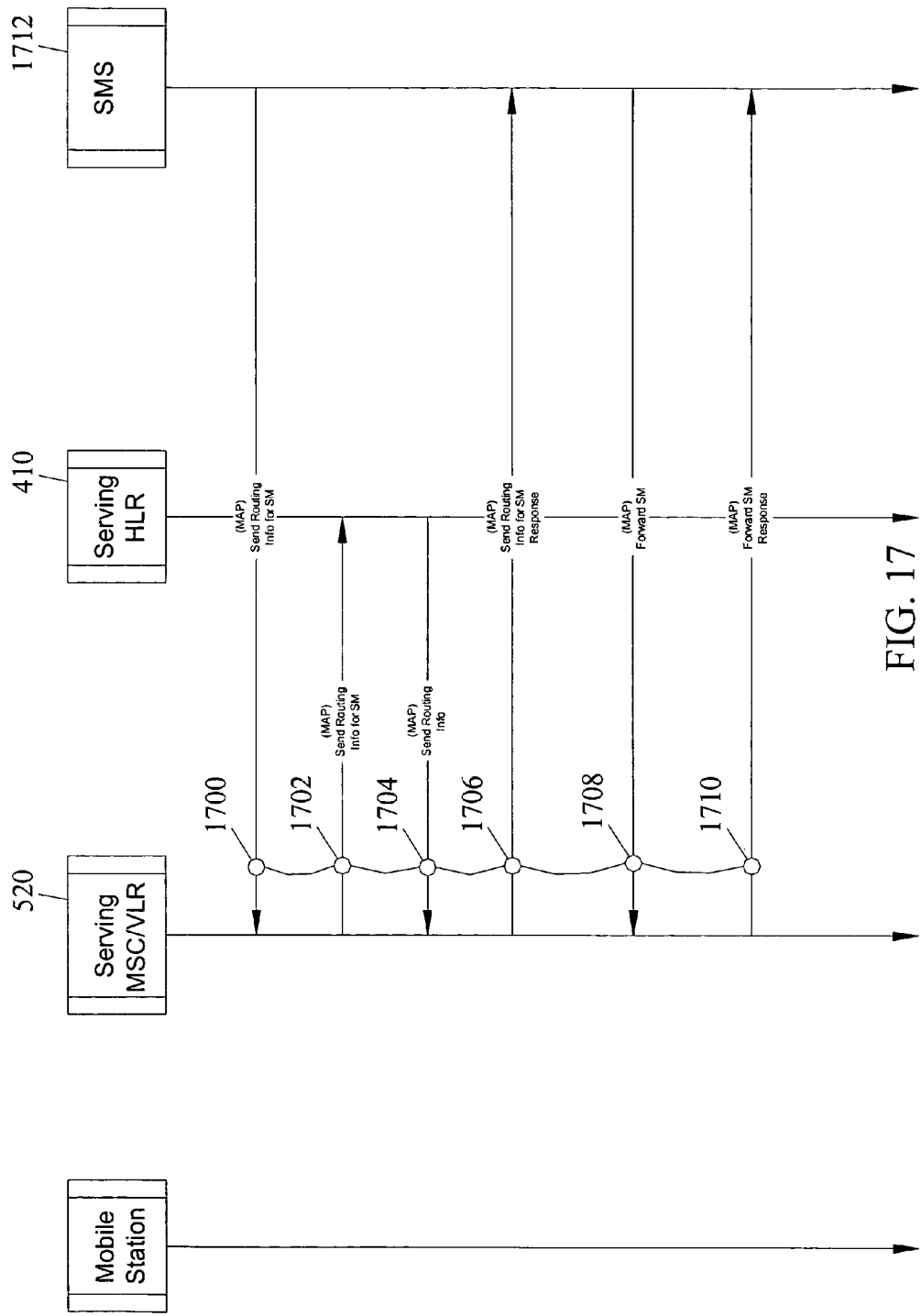
FIG. 17 is a call flow diagram of a forwarding short message service (SMS) operation associated with a generic call trace according to the subject matter disclosed herein.

FIG. 17 illustrates a call flow diagram of a forwarding SMS operation associated with a generic call trace according to the subject matter disclosed herein. Referring to FIG. 17, points 1700-1710 connect the curvilinear lines and represent steps for tracing messages associated with the forwarding SMS operation. The forwarding SMS operation includes communications involving serving MSC/VLR 520, serving HLR 410, and an SMS server 1712. The generic call trace of the operation may be initiated when a user enters an MSISDN. Module 154 may search forward and/or backward through database 156 for a message including a matching MSISDN. In this example, module 154 finds a MAP Send Routing Information for Short Message (SM) message at point 1700. The search may be limited to signaling messages having timestamps within a predetermined timestamp range.

An endpoint identifier list may be created for the call trace. Module 154 may use parameters stored in the list for tracing signaling messages associated with the call. Module 154 may extract a TCAP Transaction ID from the MAP Send Routing Information for SM message and store the extracted parameter in the endpoint identifier list.

Next, module 154 may search for a signaling message including the TCAP Transaction ID in the endpoint identifier list. In a forward search, module 154 may find a MAP Send Routing Information for SM message at point 1702, a MAP Sending Routing Information message at point 1704, and a MAP Send Routing Information for SM Response message at point 1706. An IMSI may be extracted from the message at point 1704. In a forward search, module 154 may find a MAP Forward SM message at point 1708 using the IMSI. In another forward search, a MAP Forward SM Response message may be found at point 1710 using the TCAP Transaction ID. As a result of the search, the call flow diagram of a forwarding SMS operation is traced.

Figure 18:
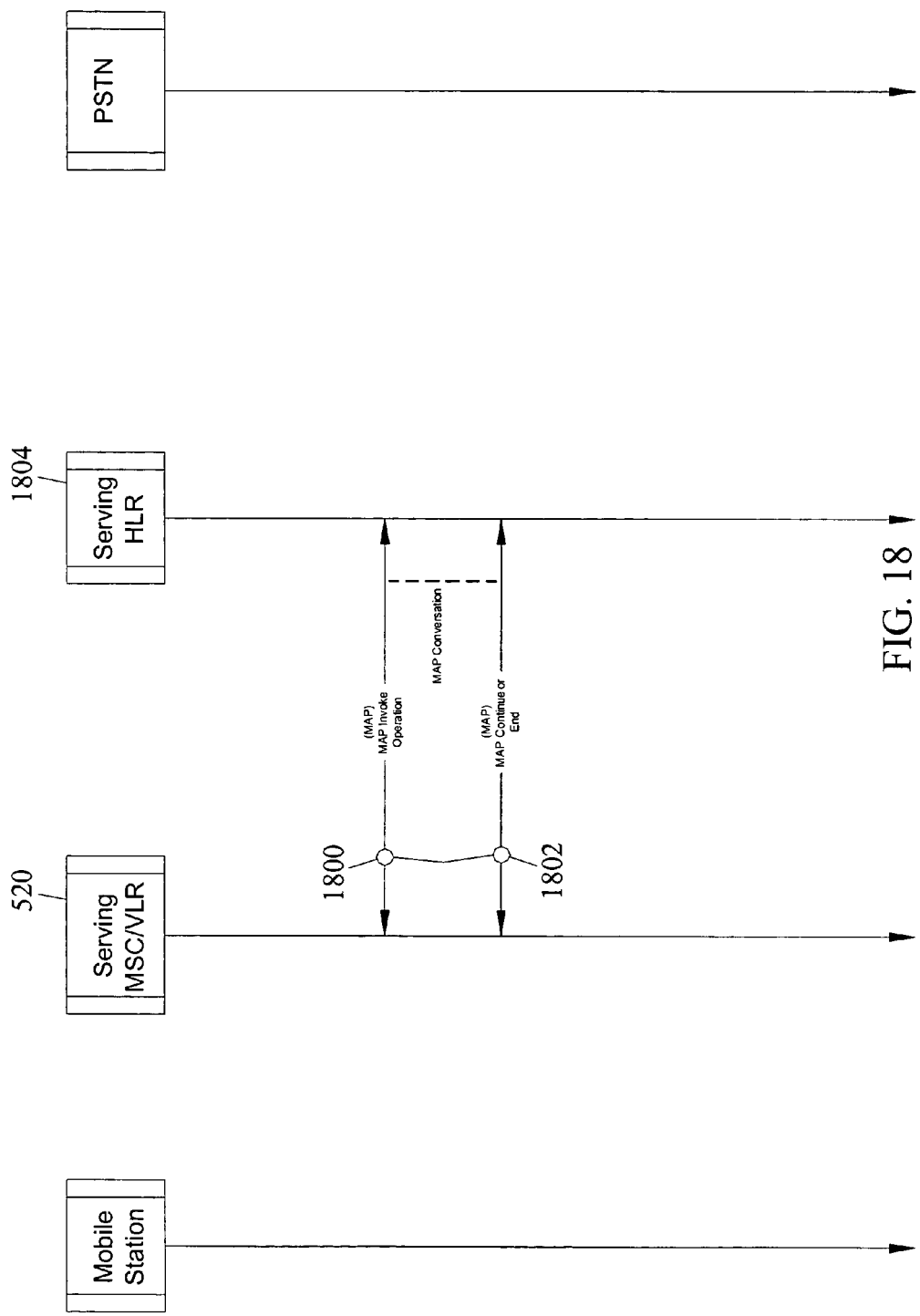
FIG. 18 is a call flow diagram of a MAP operation selected by an operator associated with a generic call trace according to the subject matter disclosed herein.

FIG. 18 illustrates a call flow diagram of a MAP operation selected by an operator associated with a generic call trace according to the subject matter disclosed herein. Referring to FIG. 18, points 1800-1802 connect the curvilinear lines and represent steps for tracing messages associated with the MAP operation. The MAP operation includes communications involving serving MSC/VLR 520 and a serving HLR (or MSC/VLR, or serving SMS) 410. The generic call trace of the operation may be initiated when a user enters any MAP operation. Module 154 may search forward and/or backward through database 156 for a matching MAP operation. In this example, module 154 finds a matching MAP Invoke Operation message at point 1800. The search may be limited to signaling messages having timestamps within a predetermined timestamp range.

An endpoint identifier list may be created for the call trace. Module 154 may use parameters stored in the list for tracing signaling messages associated with the call. Module 154 may extract a TCAP Transaction ID from the MAP Invoke Operation message and store the extracted parameter in the endpoint identifier list.

Next, the TCAP Transaction ID may be used to find a MAP Continue message (or a MAP End message) corresponding to the MAP conversation associated with the message at point 1800. As a result of the search, the call flow diagram of the MAP operation is traced.

Figure 19:
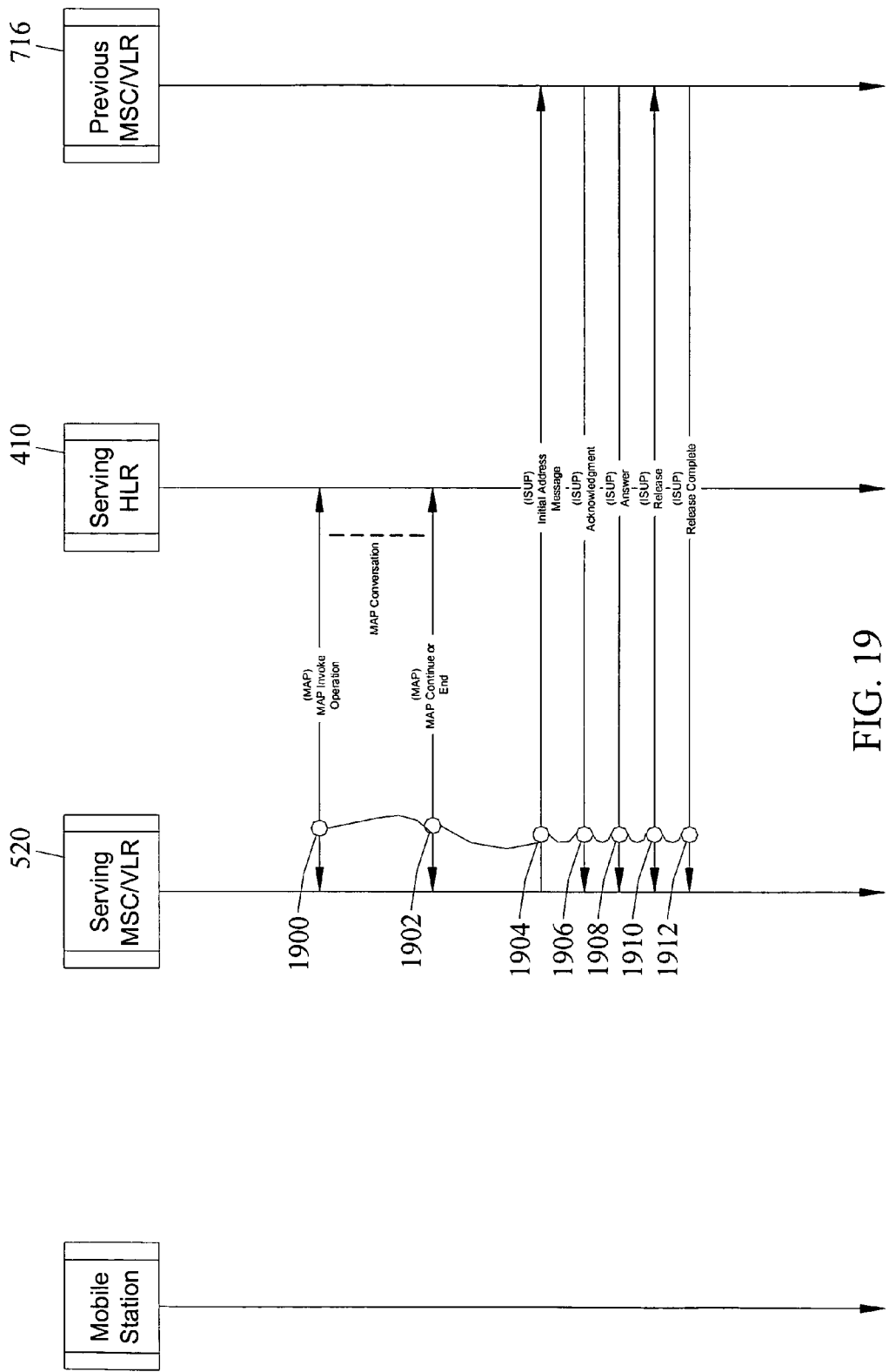
FIG. 19 is a call flow diagram of a MAP to ISUP call associated with a generic call trace according to the subject matter disclosed herein.

FIG. 19 illustrates a call flow diagram of a MAP to ISUP call associated with a generic call trace according to the subject matter disclosed herein. Referring to FIG. 19, points 1900-1912 connect the curvilinear lines and represent steps for tracing messages associated with the MAP to ISUP call. The MAP to ISUP call includes communications involving serving MSC/VLR 520, a serving HLR 410, and another MSC/VLR (or PSTN) 716. The generic call trace of the operation may be initiated when a user enters an IMSI. Module 154 may search forward and/or backward through database 156 for an MAP operation including a matching IMSI. In this example, module 154 finds a MAP Invoke Operation message including a matching IMSI at point 1900. The search may be limited to signaling messages having timestamps within a predetermined timestamp range.

An endpoint identifier list may be created for the call trace. Module 154 may use parameters stored in the list for tracing signaling messages associated with the call. Module 154 may extract a TCAP Transaction ID from the MAP Invoke Operation message and store the extracted parameter in the endpoint identifier list.

In a forward search, module 154 may find a MAP Continue (or End) message including a matching TCAP Transaction ID at point 1902. An MSISDN may be extracted from the MAP Continue message at point 1902. Module 154 may perform a forward search to find an ISUP IAM at point 1904 that includes a called party number matching the MAP MSISDN.

A CIC, an OPC, and a DPC may be extracted from the ISUP IAM and added to the endpoint identifier list. Using the CIC, the OPC, and the DPC, module may perform a forward search to find an ISUP Acknowledgment message at point 1906, an ISUP answer message at point 1908, an ISUP Release message at point 1910, and an ISUP Release Complete message at point 1912. Each of the messages at points 1906, 1908, 1910, and 1912 include matching CIC, OPC, and DPC. As a result of the search, the call flow diagram of the MAP to ISUP call is traced.

Figure 20:
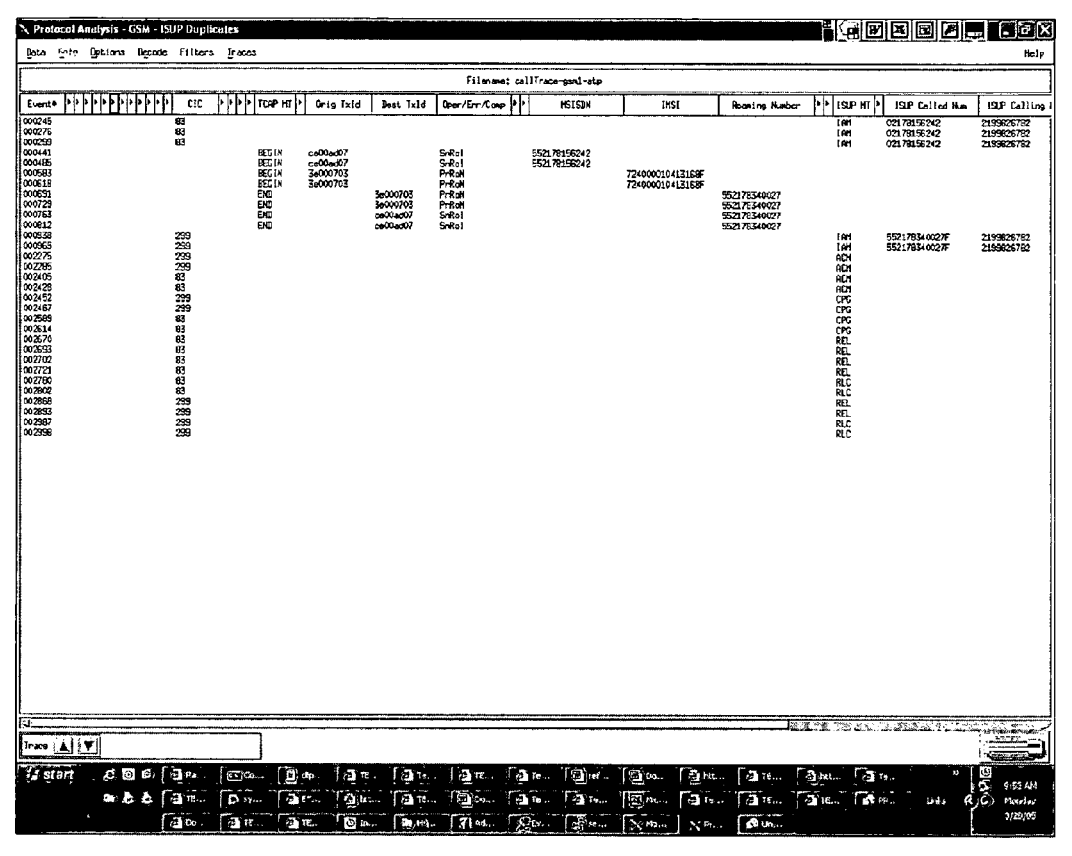

FIG. 20 illustrates a screen display of data associated with a plurality of signaling messages in a database such as database 152 shown in FIG. 2. The signaling messages in database may include matching parameters that may be used for call tracing. For example, the signaling messages may include parameters such as TCAP Transaction IDs, MSISDNs, IMSIs, roaming numbers, ISUP called party numbers, and ISUP calling party numbers. These parameters may be compared with one another for tracing messages related to a call.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for performing a trace of communications transaction using a dynamically constructed endpoint identifier list, the method comprising:
   (a) receiving a first endpoint identifier for identifying a communications endpoint;
   (b) creating an endpoint identifier list including the first endpoint identifier;
   (c) searching for and locating a signaling message including the first endpoint identifier in the endpoint identifier list;
   (d) extracting at least one parameter from the signaling message having the first endpoint identifier, the at least one parameter being distinct from the first endpoint identifier;
   (e) searching for signaling messages having the at least one parameter;
   (f) adding to the endpoint identifier list any endpoint identifiers in signaling messages found in the search for signaling messages having the at least one parameter; and
   (g) searching for signaling messages having any of the endpoint identifiers in the endpoint identifier list and thereby tracing a communications transaction involving endpoints identified by the endpoint identifiers.

2. The method according to claim 1 wherein the endpoint identifiers are selected from the identifiers consisting of a telephone number, an ENUM-translated telephone number, a SIP URI, an instant messaging (IM) identifier, an e-mail address identifier, an Internet chat session identifier, an IP address, a mobile station international ISDN number (MSISDN), and an international mobile subscriber identity (IMSI).

3. The method according to claim 1 wherein the signaling message including the at least one endpoint identifier is selected from the messages consisting of a GSM mobile application part (MAP) message, an ISDN user part (ISUP) message, and an IP telephony signaling message.

4. The method according to claim 1 wherein step (c) includes searching for a GSM MAP message including the first endpoint identifier.

5. The method according to claim 1 wherein the at least one parameter identifies a protocol associated with the signaling message having the first endpoint identifier.

6. The method according to claim 5 wherein the protocol is selected from the group consisting of MAP, TCAP, ISUP, and session initiation protocol (SIP).

7. The method according to claim 1 wherein the at least one parameter is selected from the parameters consisting of a transaction capabilities application part (TCAP) transaction identifier, an origination point code (OPC), a destination address code (DPC), a circuit identification code (CIC), and a routing number.

8. The method according to claim 1 wherein step (e) includes searching for signaling messages within a predetermined time range of a time indicated by a timestamp of the signaling message including the first endpoint identifier.

9. The method of claim 1 comprising receiving indication of selection of a message including the first endpoint identifier.

10. A system for performing a trace of a communications transaction using a dynamically constructed endpoint identifier list, the method comprising:
    (a) a database for maintaining an endpoint identifier list; and
    (b) a call trace module for:
        (i) receiving a first endpoint identifier for identifying a communications endpoint;
        (ii) adding the first endpoint identifier to the endpoint identifier list;
        (iii) searching for and locating a signaling message including the first endpoint identifier in the endpoint identifier list;
        (iv) extracting at least one parameter from the signaling message having the first endpoint identifier, the at least one parameter being distinct from the first endpoint identifier;
        (v) searching for signaling messages having the at least one parameter;
        (vi) adding the endpoint identifier list any endpoint identifiers in signaling messages found in the search for signaling messages having the at least one parameter; and
        (vii) searching for signaling messages having any of the endpoint identifiers in the endpoint identifier list and thereby tracing a communications transcoder involving endpoints identified by the endpoint identifier list.

11. The system according to claim 10 wherein the call trace module is operable to receive indication of selection of a message including the first endpoint identifier.

12. The system according to claim 10 wherein the endpoint identifiers are selected from the identifiers consisting of a telephone number, an ENUM-translated telephone number a SIP URI, an instant messaging (IM) identifier, an e-mail address identifier, an Internet chat session identifier, an IP address, a mobile station international ISDN number (MSISDN), and an international mobile subscriber identity (IMSI).

13. The system according to claim 10 wherein the signaling message including the at least one endpoint identifier is selected from the messages consisting of a GSM mobile application part (MAP) message, an ISDN user part (ISUP) message, and an IP telephony signaling message.

14. The system according to claim 10 wherein the call trace module is operable to search for a GSM MAP message including the first endpoint identifier.

15. The system according to claim 10 wherein the at least one parameter identifies a protocol associated with the signaling message having the first endpoint identifier.

16. The system according to claim 15 wherein the protocol is selected from the group consisting of MAP, TCAP, ISUP, and session initiation protocol (SIP).

17. The system according to claim 10 wherein the call identifier is selected from the identifiers consisting of a transaction capabilities application part (TCAP) transaction identifier, an origination point code (OPC), a destination address code (DPC), a circuit identification code (CIC), and routing number.

18. The system according to claim 10 wherein the call trace module is operable to search for signaling messages having the endpoint identifiers in the endpoint identifier list within a predetermined time range of a time indicated by a timestamp of the signaling message including the first endpoint identifier.

19. A computer program product comprising computer executable instructions embodied in a computer readable medium for performing steps comprising:
(a) receiving a first endpoint identifier for identifying a communications endpoint;
(b) creating an endpoint identifier list including the first endpoint identifier;
(c) searching for and locating a signaling message including the first endpoint identifier in the endpoint identifier list;
(d) extracting at least one parameter from the signaling message having the first endpoint identifier, the at least one parameter being distinct from the first endpoint identifier;
(e) searching for signaling messages having the at least one parameter;
(f) adding to the endpoint identifier list any endpoint identifiers in signaling messages found in the search for signaling messages having the at least one parameter; and
(g) searching for signaling messages having any of the endpoint identifiers in the endpoint identifier list and thereby tracing a communications transaction involving endpoints identified by the endpoint identifiers.

20. The computer program product according to claim 19 wherein the endpoint identifiers are selected from the identifiers consisting of a telephone number, an ENUM-translated telephone number, a SIP URI, an instant messaging (IM) identifier, an e-mail address identifier, an Internet chat session identifier, an IP address, a mobile station international ISDN number (MSISDN), and an international mobile subscriber identity (IMSI).

21. The computer program product according to claim 19 wherein the signaling message including the at least one endpoint identifier is selected from the messages consisting of a GSM mobile application part (MAP) message, an ISDN user part (ISUP) message, and an IP telephony signaling message.

22. The computer program product according to claim 19 wherein step (c) includes searching for a GSM MAP message including the first endpoint identifier.

23. The computer program product according to claim 19 wherein the at least one parameter identifies a protocol associated with the signaling message having the first endpoint identifier.

24. The computer program product according to claim 23 wherein the protocol is selected from the group consisting of MAP, TCAP, ISUP, and session initiation protocol (SIP).

25. The computer program product according to claim 19 wherein the at least one parameter is selected from the parameters consisting of a transaction capabilities application part (TCAP) transaction identifier, an origination point code (OPC), a destination address code (DPC), a circuit identification code (CIC), and routing number.

26. The computer program product according to claim 19 wherein step (e) includes searching for signaling messages within a predetermined time range of a time indicated by a timestamp of the signaling message including the first endpoint identifier.

27. The computer program product according to claim 19 comprising receiving indication of selection of a message including the first endpoint identifier.

* * * * *